United States Patent
Beno et al.

(10) Patent No.: US 10,915,694 B2
(45) Date of Patent: Feb. 9, 2021

(54) VIRTUAL AGENT CREATION PLATFORM

(71) Applicant: Accenture Global Solutions Limited, Dublin (IE)

(72) Inventors: Tal Beno, Thornhill (CA); Yuly Basovich, Vaughan (CA); Sally Luong, Richmond Hill (CA); Tyler Alexander Lazar, Toronto (CA)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/538,468

(22) Filed: Aug. 12, 2019

(65) Prior Publication Data

US 2020/0073919 A1    Mar. 5, 2020

Related U.S. Application Data

(60) Provisional application No. 62/723,892, filed on Aug. 28, 2018.

(51) Int. Cl.
*G06F 17/20* (2006.01)
*G06F 40/154* (2020.01)
*G06F 16/953* (2019.01)
*G06F 9/451* (2018.01)
*G06F 40/186* (2020.01)

(52) U.S. Cl.
CPC ............ *G06F 40/154* (2020.01); *G06F 9/451* (2018.02); *G06F 16/953* (2019.01); *G06F 40/186* (2020.01)

(58) Field of Classification Search
CPC .... G06F 40/154; G06F 40/186; G06F 16/953; G06F 9/451
See application file for complete search history.

(56) References Cited

U.S. PATENT DOCUMENTS

| | | | |
|---|---|---|---|
| 2003/0137539 A1* | 7/2003 | Dees | G06F 9/451 715/762 |
| 2014/0245198 A1* | 8/2014 | Lee | G06F 3/04817 715/762 |
| 2015/0222691 A1* | 8/2015 | Zhang | G06F 3/0482 715/740 |

OTHER PUBLICATIONS

Wix, "The Place to Create Professional Websites", https://www.wix.com/, 9 pages.
Facebook, "Message Templates", https://developers.facebook.com/docs/messenger-platform/send-messages/templates, Oct. 22, 20197, 4 pages.
Microsoft, "Adaptive Cards for Bot Developers", https://docs.microsoft.com/en-us/adaptive-cards/getting-started/bots, May 29, 2018, 5 pages.

* cited by examiner

*Primary Examiner* — Keith D Bloomquist
(74) *Attorney, Agent, or Firm* — Harrity & Harrity, LLP

(57) ABSTRACT

A device may receive a widget template of a widget. The widget template may include information relating to one or more fields of the widget and content for the one or more fields. The device may receive a stylesheet of the widget. The stylesheet may include information relating to respective style identifiers of the one or more fields. The device may generate a markup object of the widget based on the widget template. The markup object may include respective markup object entries for populating the one or more fields with the content. The device may assign the respective style identifiers to the respective markup object entries, and cause an action to be performed in connection with the markup object.

20 Claims, 16 Drawing Sheets

VIRTUAL AGENT CREATION PLATFORM

RELATED APPLICATION(S)

This application claims priority under 35 U.S.C. § 119 to U.S. Provisional Patent Application No. 62/723,892, filed on Aug. 28, 2018, and entitled "CONFIGURABLE VIRTUAL AGENT COMPUTER PROGRAMS," the content of which is incorporated by reference herein in its entirety.

BACKGROUND

A virtual agent is a computer-based interface (e.g., that is supported by a web-based application, a proprietary application that may or may not be web-based, and/or the like) which conducts a conversation with a human based on textual, visual, and/or verbal input. Virtual agents may be designed to simulate a behavior and/or a response by a human as a conversational partner. Virtual agents may be used in dialog systems for various purposes, including customer service or information acquisition. Some virtual agents may use sophisticated natural language processing systems to understand human input and generate an appropriate response based on the human input. Other virtual agents may scan for keywords within the human input, query a data structure of preprogrammed responses for matching keywords and/or wording patterns, and retrieve a response corresponding to the keywords and/or wording patterns.

SUMMARY

According to some implementations, a method may include receiving, by a device, a widget template of a widget, wherein the widget template includes information relating to a static field of the widget, a dynamic field of the widget, and static content for the static field; receiving, by the device, a data template of the widget, wherein the data template includes information relating to dynamic content for the dynamic field; receiving, by the device and from a network storage device, the dynamic content associated with the dynamic field; receiving, by the device, a stylesheet of the widget, wherein the stylesheet includes information relating to respective style identifiers of the static field and the dynamic field; generating, by the device, a markup object of the widget based on the widget template and the data template, wherein the markup object includes respective markup object entries for populating the static field with the static content and populating the dynamic field with the dynamic content; assigning, by the device, the respective style identifiers to the respective markup object entries; and causing, by the device, an action to be performed in connection with the markup object.

According to some implementations, a device may include one or more memories, and one or more processors, communicatively coupled to the one or more memories, to: receive a widget template of a widget, wherein the widget template includes information relating to one or more fields of the widget and content for the one or more fields; receive a stylesheet of the widget, wherein the stylesheet includes information relating to respective style identifiers of the one or more fields; generate a markup object of the widget based on the widget template, wherein the markup object includes respective markup object entries for populating the one or more fields with the content; assign the respective style identifiers to the respective markup object entries; and cause an action to be performed in connection with the markup object.

According to some implementations, a non-transitory computer-readable medium may store one or more instructions. The one or more instructions, when executed by one or more processors, may cause the one or more processors to: receive a widget template of a widget, wherein the widget template includes information relating to a static field of the widget, a dynamic field of the widget, and static content for the static field; receive a data template of the widget, wherein the data template includes information relating to dynamic content for the dynamic field; receive, from a network storage device, the dynamic content associated with the dynamic field; receive a stylesheet of the widget, wherein the stylesheet includes information relating to respective style identifiers of the static field and the dynamic field; generate a markup object of the widget based on the widget template and the data template, wherein the markup object includes respective markup object entries for populating the static field with the static content and populating the dynamic field with the dynamic content; assign the respective style identifiers to the respective markup object entries; and cause the widget to be rendered according to the markup object.

DETAILED DESCRIPTION

Figure 1A:
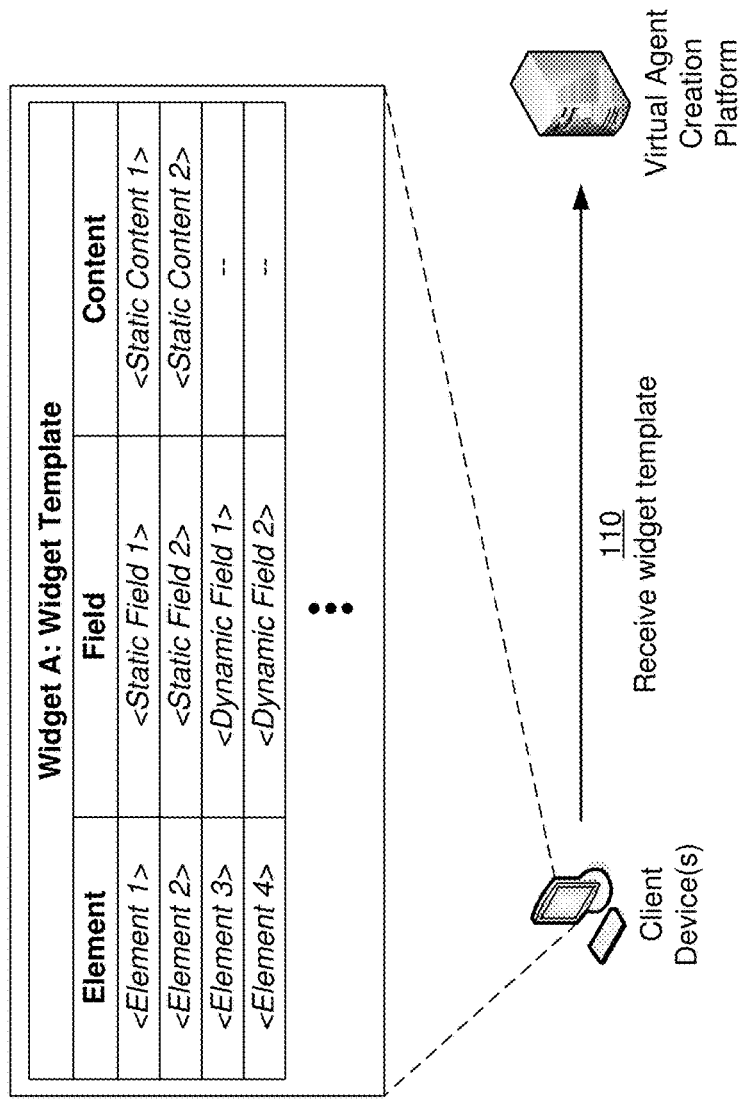
FIGS. 1A-1E are diagrams of one or more example implementations described herein.

The following detailed description of example implementations refers to the accompanying drawings. The same reference numbers in different drawings may identify the same or similar elements.

A virtual agent is a computer-based interface that is often used by businesses to conduct a conversation (e.g., via textual, visual, and/or verbal input) with a user (e.g., a customer, a prospective customer, and/or the like). For example, a virtual agent may be presented in a form of a messaging interface that is supported by a web-based application, a proprietary application that may or may not be web-based, and/or the like, and designed to receive textual input from a user and display an automated response based on keywords contained in the textual input. An automated response may be preprogrammed to include information that may be useful to the user (e.g., answers to frequent or common user queries), and indexed by keywords (e.g., keywords commonly contained in user queries requesting the information). In some cases, the automated response may be designed to display a combination of information (e.g., a combination of static data, real-time or dynamic data, a graphic, an image, and/or the like). Depending on a design and/or a complexity of such automated responses, also referred to as widgets, a virtual agent may enable a business to significantly reduce incoming calls to a call center and/or conserve resources otherwise needed to maintain customer service facilities without sacrificing quality of customer service.

Due to such advantages, virtual agents have gained popularity among businesses. As reliance on virtual agents increases, however, demands for customizable virtual agents and/or widgets also increase. While different virtual agents may function in a similar manner, a widget sought by a particular business, for a particular use case, may vary significantly from a widget sought by another business for a different use case. Furthermore, information and/or aesthetic designs provided within a widget of a particular virtual agent may often need to be updated. Accordingly, a business may want to be able to quickly and easily add, modify, update, and/or otherwise configure a widget of a virtual agent. In some cases, a business may need to contract a team of specialized developers, programmers, and/or designers to create, customize, and/or update a widget of a virtual agent. However, this can be time-consuming, costly, and cumbersome, especially when the widget contains elements that are frequently modified and/or updated. In some cases, a business may use available development frameworks to help design and/or modify widgets of a virtual agent. Such frameworks may be easier to use and obviate a need for specialized developers, programmers, and/or designers. However, such frameworks may rely on rigid and unconventional markup languages, provide only a limited number of universal preset designs to choose from, and/or lack the customizability sought by businesses.

Some implementations described herein provide a virtual agent creation platform that may enable a developer to configure a custom widget of a virtual agent in a quick and easy manner. The virtual agent creation platform may receive a widget template that includes information relating to one or more fields of the widget and content for the one or more fields, receive a stylesheet that includes information relating to respective style identifiers of the fields, generate a markup object of the widget based on the widget template, and cause an action to be performed in connection with the markup object. The markup object may include respective markup object entries for populating the one or more fields with the content, and assign the respective style identifiers to the respective markup object entries. In some implementations, such as when the widget is to include a static field for displaying static content and a dynamic field for displaying dynamic content, the virtual agent creation platform may receive a data template that includes information relating to dynamic content for the dynamic field, receive the dynamic content associated with the dynamic field from a network storage device, and generate the markup object based on the data template.

In this way, the virtual agent creation platform may facilitate a process by which a developer creates and customizes virtual agents and/or widgets of virtual agents. For instance, because the virtual agent creation platform uses standard markup languages to design widgets, a developer has more flexibility in designing widgets and is not restricted to universal preset designs specified by existing development frameworks. Furthermore, because the virtual agent creation platform uses standard markup languages, a business does not need to rely on specialized developers, programmers, and/or designers to customize and/or update widgets of a virtual agent. Additionally, the virtual agent creation platform provides a simplified process for stylizing widgets, which uses a set of templates for defining static fields and/or dynamic fields and a separate stylesheet for defining style rulesets for the static fields and/or the dynamic fields. Furthermore, with a more simplified design process, developers are able to conserve computational and/or networking resources that may otherwise be needed to customize a virtual agent for a business. In addition, because businesses are able to customize and/or update virtual agents in less time, businesses are able to conserve computational and/or networking resources and/or infrastructure otherwise needed to support customer service agents, call centers, and/or other alternatives to virtual agent solutions.

FIGS. 1A-1E are diagrams of one or more example implementations 100 described herein. As shown in FIGS. 1A-1E, the example implementation(s) 100 may include a virtual agent creation platform, a client device, a network storage device, and a rendering device. FIGS. 1A-1E present one or more functions that may be performed by the virtual agent creation platform to configure a widget of a virtual agent. For example, the virtual agent creation platform may receive a widget template that includes information relating to one or more fields of the widget and content for the one or more fields, receive a stylesheet that includes information relating to respective style identifiers of the one or more fields, generate a markup object of the widget based on the widget template, and cause an action to be performed in connection with the markup object. In some implementations, such as when the widget is to include a static field for displaying static content and a dynamic field for displaying dynamic content, the virtual agent creation platform may receive a data template that includes information relating to dynamic content for the dynamic field, receive the dynamic content associated with the dynamic field from a network storage device storing the dynamic content, and generate the markup object based on the data template. In some implementations, one or more of the functions, described herein as being performed by the virtual agent creation platform, may be performed by another device, such as the client device, the network storage device, the rendering device, and/or the like.

In some implementations, the virtual agent creation platform may be used in association with a virtual agent creation service that is supported by the client device, the network storage device, the rendering device, and/or the like. For example, the virtual agent creation service may be used by a user (e.g., a developer, a programmer, a designer, and/or another subscriber) to create, modify, and/or transmit a widget template, a data template, and/or a stylesheet in the form of an electronic document, file, table, and/or the like, and configure a virtual agent, a widget of the virtual agent, an element within the widget, and/or another attribute of the virtual agent. The virtual agent creation service may provide features, such as enabling a user to render a widget and/or a virtual agent, maintain an indexable library of widgets, templates, stylesheets, and/or markup objects previously created by and/or generated for the user or another user, query the library of widgets, templates, stylesheets, and/or markup objects, and/or the like. In some examples, the virtual agent creation service may provide a graphical user interface that enables a user to visually preview and/or modify a widget and/or a virtual agent. A user may access the virtual agent creation service using the client device (e.g., a computer, a smart phone, a mobile device, and/or the like) over a wired connection and/or a wireless connection to the virtual agent creation platform.

As shown in FIG. 1A, and by reference number 110, the virtual agent creation platform may receive a widget template of a widget from the client device. The widget template may define one or more elements to be included in the widget (e.g., an automated response) of an associated virtual agent, assign respective identifiers for the elements of the widget, define respective properties and/or values of the elements, and/or the like. For example, the widget template may define an element (e.g., Element 1 or Element 2) as a static field for displaying static content (e.g., a value and/or a property that is to remain fixed), or define an element (e.g., Element 3 or Element 4) as a dynamic field for displaying dynamic content (e.g., a value and/or a property that may change over time). Elements defined as static fields may be assigned corresponding static content (e.g., alphanumeric characters, symbols, labels, dividers, borders, graphics, images, and/or the like) using the widget template. Elements defined as dynamic fields may be assigned corresponding dynamic content (e.g., real-time data values, status identifiers, progress bars, and/or the like) using another template (e.g., a data template), as described in more detail below. The widget template may be provided in one or more key-value formats (e.g., a JavaScript Object Notation (JSON) format, a YAML Ain't Markup Language (YAML) format, an eXtensible Markup Language (XML) format, and/or another standard format).

In some implementations, a user of the client device may generate the widget template from within the client device, and transmit the widget template to the virtual agent creation platform (e.g., via a virtual agent creation service). In some examples, the user may transmit the widget template to the network storage device and/or the rendering device, and the virtual agent creation platform may receive the widget template from the network storage device and/or the rendering device. Additionally, or alternatively, a user of the client device may download a blank or a partially blank widget template from the virtual agent creation platform, the network storage device, and/or the rendering device (e.g., via a virtual agent creation service), complete the widget template, and transmit the widget template to the virtual agent creation platform directly and/or indirectly via the network storage device and/or the rendering device. In some examples, a user of the client device may access a blank or a partially blank widget template that is stored on the virtual agent creation platform, the network storage device, and/or the rendering device (e.g., via a web-based interface and/or another user interface provided by a virtual agent creation service), complete the widget template, and submit the widget template to the virtual agent creation platform directly and/or indirectly via the network storage device and/or the rendering device.

Figure 1B:
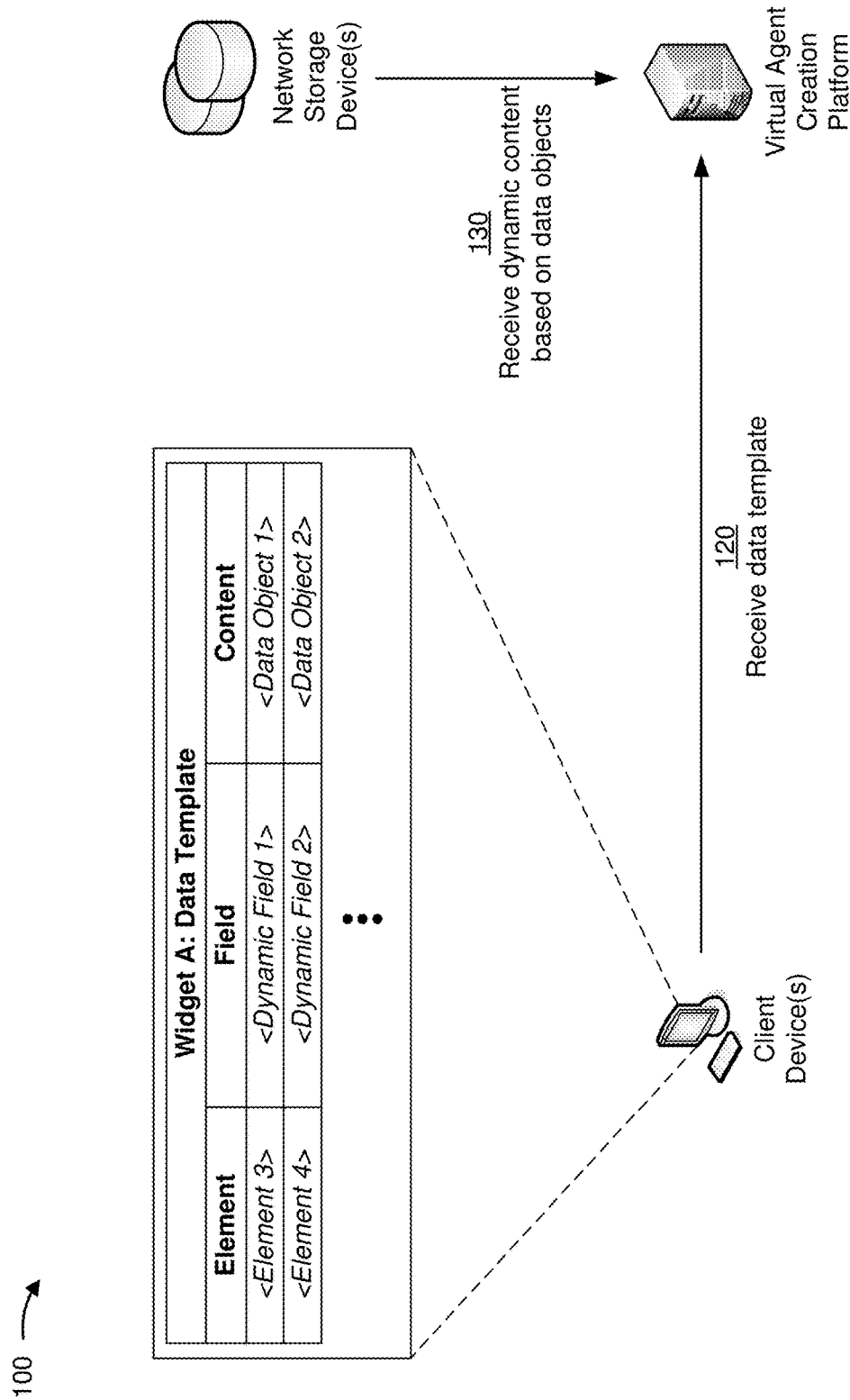

As shown in FIG. 1B, and by reference number 120, the virtual agent creation platform may receive a data template of a widget from the client device. The data template may define dynamic content to be included in the widget and associated with one or more elements of the widget defined as dynamic fields (e.g., by a widget template). More particularly, because the dynamic content may correspond to a value and/or a property that may change over time (e.g., real-time data values, status identifiers, progress bars, and/or the like), the data template may define the dynamic content using data objects (e.g., Data Object 1 and Data Object 2) that enable the corresponding dynamic content to be fetched from the network storage device and/or another data source. For example, a data object associated with a dynamic field may be embedded within the data template and provided in a form of an index to dynamic content intended for the associated dynamic field. In some examples, the data object may index a particular network storage device that is accessible to the virtual agent creation platform, a memory address within a network storage device, and/or another data structure location that enables the data object to be resolved to the corresponding dynamic content. The data template may be provided using one or more key-value formats (e.g., a JSON format, a YAML format, an XML format, and/or another standard format).

In some implementations, a user of the client device may generate the data template from within the client device, and transmit the data template to the virtual agent creation platform (e.g., via a virtual agent creation service). In some examples, the user may transmit the data template to the network storage device and/or the rendering device, and the virtual agent creation platform may receive the data template from the network storage device and/or the rendering device. Additionally, or alternatively, a user of the client device may download a blank or a partially blank data template from the virtual agent creation platform, the network storage device, and/or the rendering device (e.g., via a virtual agent creation service), complete one or more fields of the data template, and transmit the data template to the virtual agent creation platform directly and/or indirectly via the network storage device and/or the rendering device. In some examples, a user of the client device may access a blank or a partially blank data template that is stored on the virtual agent creation platform, the network storage device, and/or the rendering device (e.g., via a web-based interface and/or another user interface provided by a virtual agent creation service), complete one or more fields of the data template, and submit the data template to the virtual agent creation platform directly and/or indirectly via the network storage device and/or the rendering device.

As further shown in FIG. 1B, and by reference number 130, the virtual agent creation platform may receive dynamic content from the network storage device based on a data template of a widget. For example, based on the data template received from the client device, the virtual agent creation platform may identify a data object that is embedded within and/or otherwise associated with a dynamic field and that indexes dynamic content intended for the dynamic field. The virtual agent creation platform may use the data object to query the network storage device and/or another data source for the dynamic content indexed by the data object, receive the dynamic content, and resolve the data object to the dynamic content. For example, a data object (e.g., Data Object 1) associated with a dynamic field (e.g., Dynamic Field 1) may be resolved to the dynamic content (e.g., a real-time data value, a status identifier, a progress bar, and/or the like) intended for the dynamic field. In some examples, the virtual agent creation platform may receive updated dynamic content intermittently, periodically, and/or continuously in real-time. In some examples, such as when a user prefers not to include a dynamic field in a widget, the virtual agent creation platform may not receive a data template and proceed to creating the widget based on one or more static fields defined by a widget template.

Figure 1C:
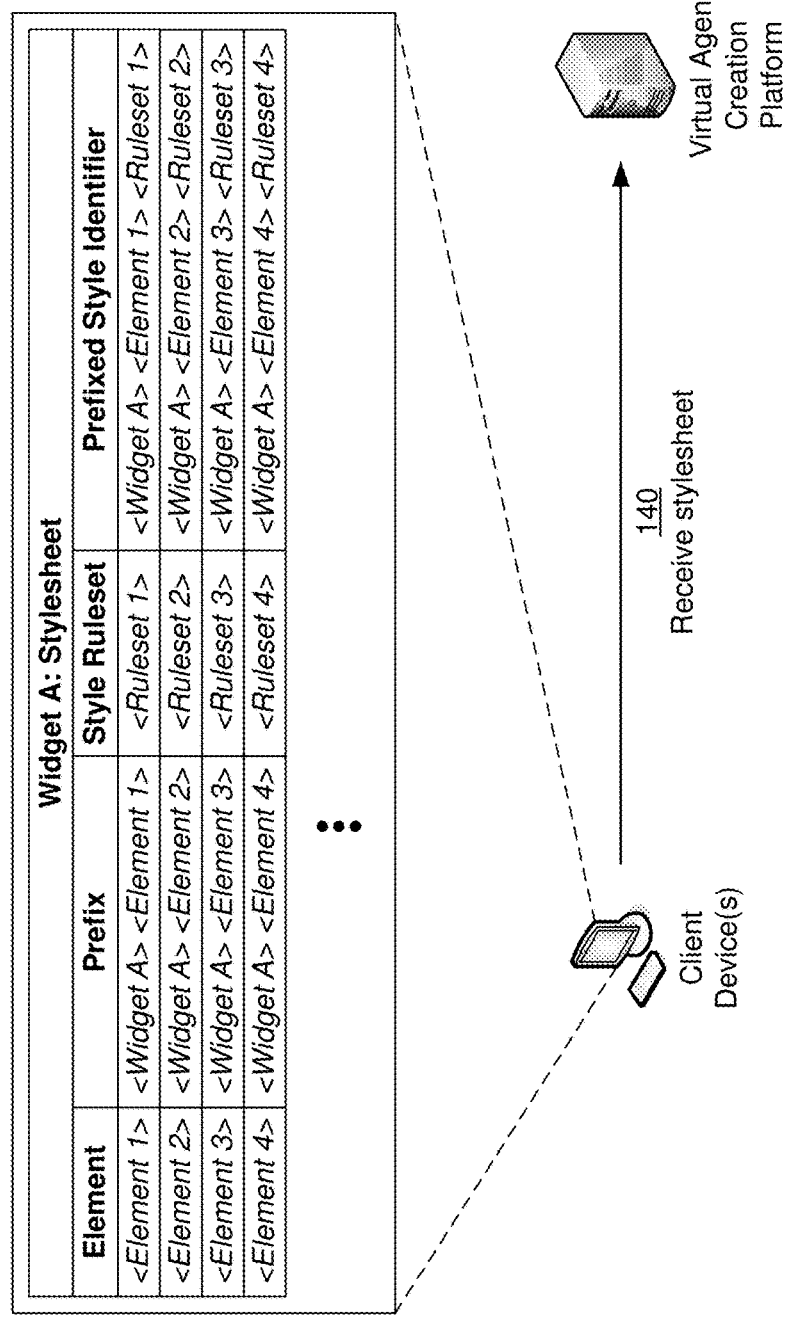

As shown in FIG. 1C, and by reference number 140, the virtual agent creation platform may receive a stylesheet of a widget from the client device. The stylesheet may define a style identifier of an element (e.g., a static field or a dynamic field) of the widget. For example, the style identifier may specify a style ruleset (e.g., a set of design parameters specifying a color, a font, a dimension, a visual effect, a position, and/or another design attribute) to be used to render the element with a desired style (e.g., with a particular appearance and/or in a particular arrangement). In some examples, the style ruleset may define a position, an orientation, and/or an arrangement of an element within a widget using a grid system, a coordinate system, and/or another positioning system that may be supported by the stylesheet and/or the rendering device. The stylesheet may be configured such that a style of an element within a widget may be modified and customized within the stylesheet and without modification to the widget template and/or the data template. In some examples, such as when a single widget is to be rendered in different styles (e.g., to be used for different virtual agents and/or different applications), the virtual agent creation platform may receive multiple stylesheets for the single widget. The stylesheet may be provided in one or more markup formats (e.g., a Cascading Style Sheets (CSS) format, a Hypertext Markup Language (HTML) format, an XML format, and/or another standard format).

In some implementations, the style identifier may be defined to be specific to an element within a set of elements designated for a widget, and/or specific to an element of a widget within a set of widgets. For example, the stylesheet may use a naming scheme which defines the style identifier by prefixing or otherwise appending the corresponding style ruleset (e.g., Ruleset 1) with a widget identifier (e.g., Widget A) and/or an element identifier (e.g., Element 1). The naming scheme may be configured to maintain an association between the style identifier and the corresponding element, and to avoid naming conflicts that may occur when working with multiple elements and/or multiple widgets. For example, if different elements of a widget are to be rendered with the same style, the stylesheet may define different style identifiers sharing the same ruleset but prefixed with different element identifiers. If a single element is to be displayed with different styles within a widget, the stylesheet may define different style identifiers sharing the same element identifier but appended with different rulesets. Additionally, or alternatively, if multiple widgets (e.g., for different virtual agents) are to be rendered with the same elements and/or the same styles, the stylesheet may define different style identifiers sharing the same element identifier and/or the same ruleset but prefixed with different widget identifiers.

In some implementations, a user of the client device may generate the stylesheet from within the client device, and transmit the stylesheet to the virtual agent creation platform (e.g., via a virtual agent creation service). In some examples, the user may transmit the stylesheet to the network storage device and/or the rendering device, and the virtual agent creation platform may receive the stylesheet from the network storage device and/or the rendering device. Additionally, or alternatively, a user of the client device may download a blank or a partially blank stylesheet from the virtual agent creation platform, the network storage device, and/or the rendering device (e.g., via a virtual agent creation service), complete the stylesheet, and transmit the stylesheet to the virtual agent creation platform directly and/or indirectly via the network storage device and/or the rendering device. In some examples, a user of the client device may access a blank or a partially blank stylesheet that is stored on the virtual agent creation platform, the network storage device, and/or the rendering device (e.g., via a web-based interface and/or another user interface provided by a virtual agent creation service), complete the stylesheet, and submit the stylesheet to the virtual agent creation platform directly and/or indirectly via the network storage device and/or the rendering device.

Figure 1D:
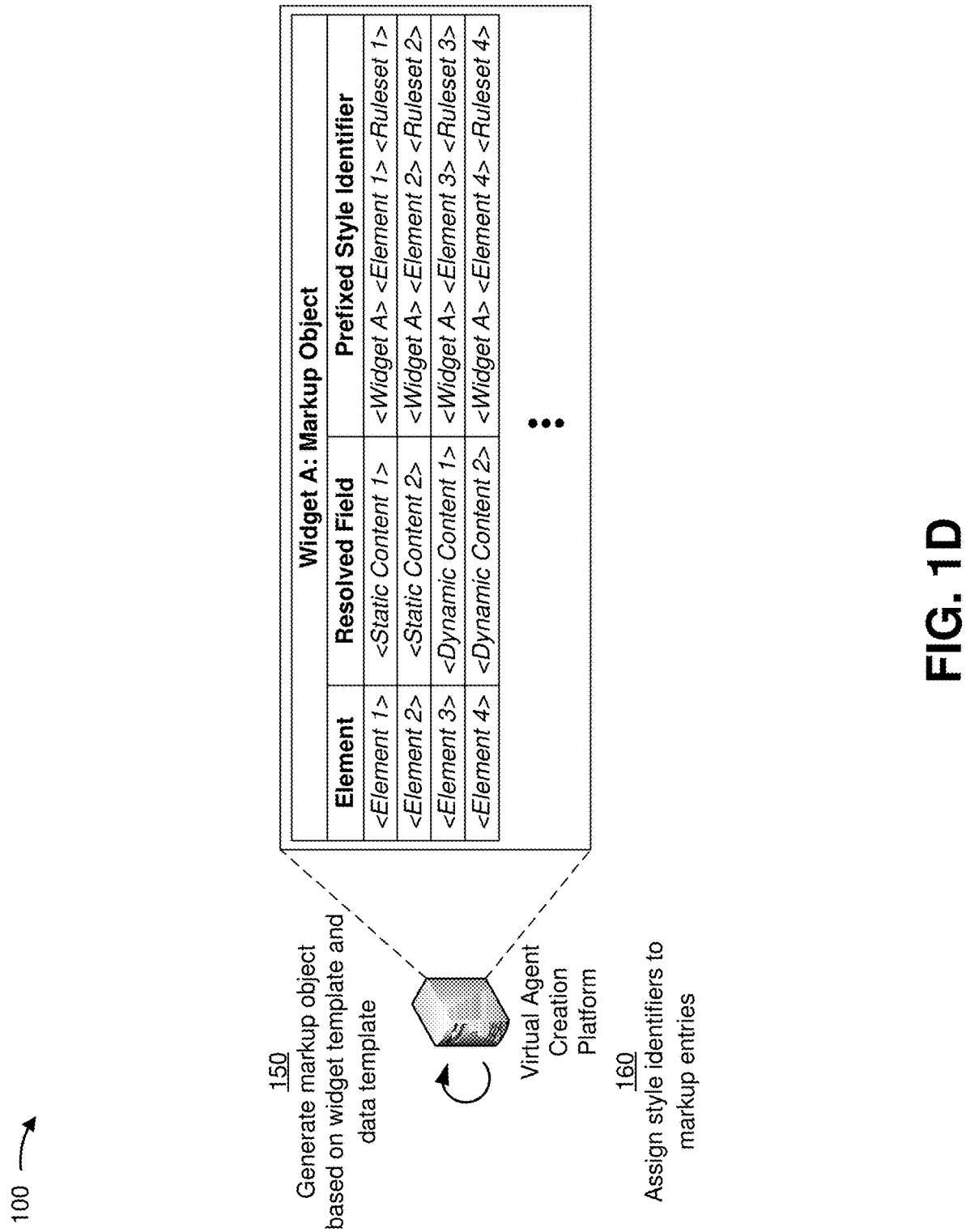

As shown in FIG. 1D, and by reference number 150, the virtual agent creation platform may generate a markup object based on a widget template and a data template. The markup object may correspond to an electronic document, file, table, and/or the like that defines a widget using one or more markup object entries (e.g., blocks of a markup language and/or the like that are recognizable by the rendering device) corresponding to one or more elements of the widget. For example, the markup object may include respective markup object entries corresponding to one or more elements (e.g., static fields and/or dynamic fields) that are defined by the widget template and populated with corresponding content (e.g., static content and/or dynamic content) defined by the widget template and/or the data template. In some examples, the virtual agent creation platform may populate a static field (e.g., Element 1) with corresponding static content (e.g., Static Content 1) that is defined by the widget template, and if provided, populate a dynamic field (e.g., Element 3) with corresponding dynamic content (e.g., Dynamic Content 1) that is indexed by the data template. The virtual agent creation platform may generate the markup object in one or more markup formats (e.g., a CSS format, an HTML format, an XML format, and/or another standard format).

As further shown in FIG. 1D, and by reference number 160, the virtual agent creation platform may assign respective style identifiers to respective elements of a widget (e.g., to respective markup object entries of a markup object). For example, the virtual agent creation platform may identify a style identifier (e.g., Widget A Element 1 Ruleset 1) based on a stylesheet received from the client device, identify a corresponding markup object entry based on a prefix of the style identifier (e.g., Widget A Element 1), and assign the style ruleset (e.g., Ruleset 1) to the markup object entry. The virtual agent creation platform may thereby convert the markup object into a stylized markup object that the rendering device can use to render and/or display the widget. The virtual agent creation platform may assign the style identifiers to the markup object entries using one or more markup formats that are recognizable by the rendering device (e.g., a CSS format, an HTML format, an XML format, and/or another standard format). In some examples, the virtual agent creation platform may be capable of generating a single markup object for a single widget or for multiple widgets. In some examples, the virtual agent creation platform may be capable of generating multiple markup objects for a single widget or for multiple widgets.

Figure 1E:
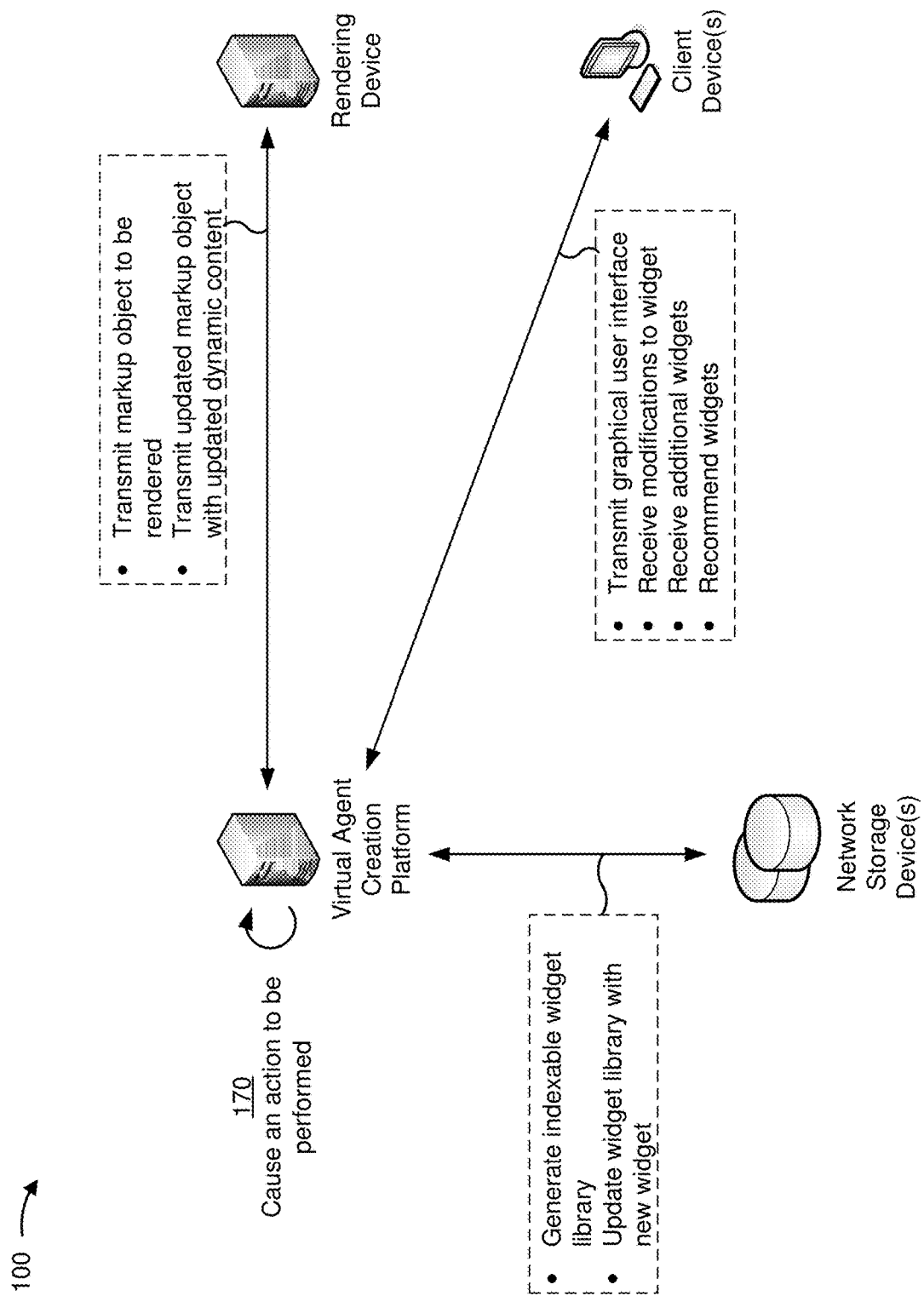

As shown in FIG. 1E, and by reference number 170, the virtual agent creation platform may cause an action to be performed in connection with a markup object that is generated for a widget. In some examples, the virtual agent creation platform may cause the widget to be rendered according to the markup object. For example, the virtual agent creation platform may transmit the markup object to the rendering device, and enable the rendering device to render the widget and elements of the widget according to respective style identifiers and markup object entries defined in the markup object. In some examples, such as when the widget includes a dynamic field that is populated with dynamic content, the virtual agent creation platform may update the markup object with updated dynamic content, and transmit the updated markup object to the rendering device intermittently, periodically, and/or continuously in real-time. Additionally, or alternatively, the rendering device may be configured to semi-autonomously or autonomously update a rendering of the widget based on a change in the dynamic content.

In some implementations, the virtual agent creation platform may generate and/or maintain an indexable library of previously generated widgets, widget templates, data templates, stylesheets, and/or markup objects. For example, the virtual agent creation platform may assign a widget identifier (e.g., Widget A) to a markup object that is generated for a user, update the library with the markup object, and enable the markup object to be indexed by the widget identifier. In some examples, the virtual agent creation platform may query the library for a user (e.g., to retrieve a template, a stylesheet, and/or a markup object previously used by the user, to recommend a template, a stylesheet, and/or a markup object to use for a new widget, and/or the like). The virtual agent creation platform may transmit results of the query to the user via the client device (e.g., via a virtual agent creation service), and enable the user to select, access, and/or modify a template, a stylesheet, and/or a markup object via the client device. If modifications are made to an existing widget and/or markup object by the user, the virtual agent creation platform may assign a new widget identifier to the modified widget and/or markup object, and add the modified widget and/or markup object to the library. In some examples, the virtual agent creation platform may store the library within a memory of the client device, a memory of the network storage device, and/or a memory of the rendering device.

In some implementations, the virtual agent creation platform may generate a graphical user interface that can be used by a user to visually modify a widget. In some examples, the graphical user interface may render a preview of a widget based on a markup object, receive a modification to the widget via the preview, and cause a corresponding modification to the associated markup object. For example, the graphical user interface may enable the user to add, edit, remove, and/or rearrange an element within the preview, and simultaneously modify markup object entries of the associated markup object. Additionally, or alternatively, the graphical user interface may enable the user to add, edit, remove, and/or rearrange an element within the markup object, and simultaneously modify the associated preview. The virtual agent creation platform may transmit the graphical user interface to the user via the client device (e.g., via a virtual agent creation service) or otherwise enable the user to access the graphical user interface (e.g., via a web-based interface and/or another user interface supported by the virtual agent creation platform). In some examples, the virtual agent creation platform may store the graphical user interface within a memory of the client device, the network storage device, and/or the rendering device.

In this way, the virtual agent creation platform may facilitate a process by which a developer creates and customizes virtual agents and/or widgets of virtual agents. For instance, because the virtual agent creation platform uses standard markup languages to design widgets, a developer has more flexibility in designing widgets and is not restricted to universal preset designs specified by existing development frameworks. Furthermore, because the virtual agent creation platform uses standard markup languages, a business does not need to rely on specialized developers, programmers, and/or designers to customize and/or update widgets of a virtual agent. Additionally, the virtual agent creation platform provides a simplified process for stylizing widgets, which uses a set of templates for defining static fields and/or dynamic fields and a separate stylesheet for defining style rulesets for the static fields and/or the dynamic fields. Furthermore, with a more simplified design process, developers are able to conserve computational and/or networking resources that may otherwise be needed to customize a virtual agent for a business. In addition, because businesses are able to customize and/or update virtual agents in less time, businesses are able to conserve computational and/or networking resources and/or infrastructure otherwise needed to support customer service agents, call centers, and/or other alternatives to virtual agent solutions.

As indicated above, FIGS. 1A-1E are provided as one or more examples. Other examples can differ from what is described with regard to FIGS. 1A-1E.

Figure 2:
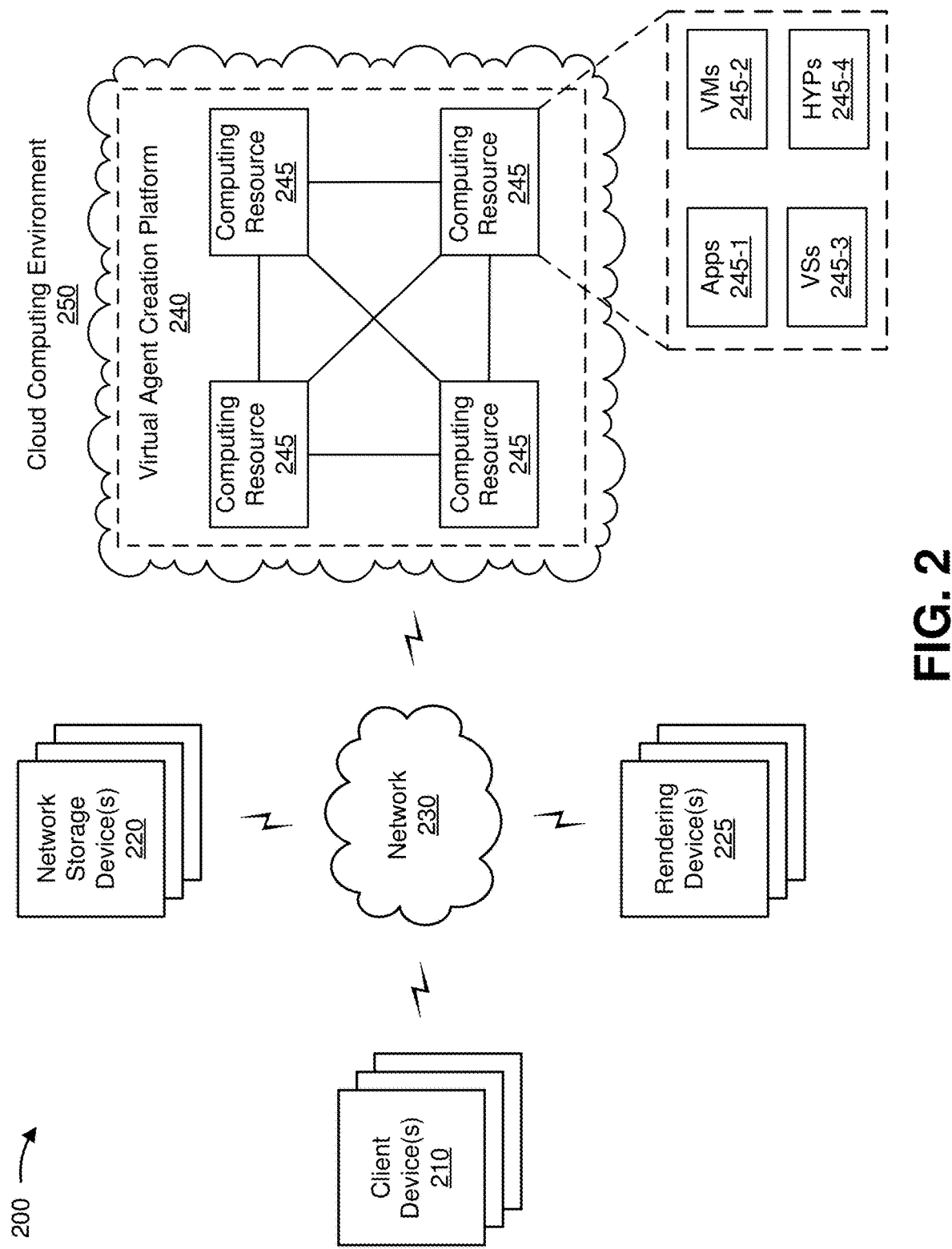
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210 (referred to herein individually as client device 210 and collectively as client devices 210), one or more network storage devices 220 (referred to herein individually as network storage device 220 and collectively as network storage devices 220), one or more rendering devices 225 (referred to herein individually as rendering device 225 and collectively as rendering devices 225), network 230, virtual agent creation platform 240, computing resource 245, and cloud computing environment 250. Devices of environment 200 may interconnect via wired connections, wireless connections, or a combination of wired and wireless connections.

Client device 210 includes one or more devices capable of receiving, generating, storing, processing, and/or providing information associated with configuring a widget of a virtual agent. For example, client device 210 may include a communication and/or computing device, such as a mobile phone (e.g., a smart phone, a radiotelephone, and/or the like), a laptop computer, a tablet computer, a handheld computer, a desktop computer, a wearable communication device (e.g., a smart wristwatch, a pair of smart eyeglasses, and/or the like), or a similar type of device.

Network storage device 220 includes one or more devices capable of storing, processing, and/or routing information. Network storage device 220 may include, for example, a server device, a device that stores a data structure, a device in a cloud computing environment or a data center, a device in a core network of a network operator, a network controller, and/or the like. In some implementations, network storage device 220 may include a communication interface that allows network storage device 220 to receive information from and/or transmit information to other devices in environment 200, such as client device 210, rendering device 225, virtual agent creation platform 240, and/or the like.

Rendering device 225 includes one or more devices capable of storing, processing, and/or routing information. In some implementations, rendering device 225 may be configured to parse a markup object (e.g., provided in a CSS format, an HTML format, an XML format, and/or another standard markup language), and display elements of a widget according to markup object entries of the markup object (e.g., via a web browser application, a web-based application, a proprietary application of a proprietary system, and/or another user interface supported by rendering device 225). Rendering device 225 may include, for example, a server device, a device that stores a data structure, a device in a cloud computing environment or a data center, a device in a core network of a network operator, a network controller, and/or the like. In some implementations, rendering device 225 may include a communication interface that allows rendering device 225 to receive information from and/or transmit information to other devices in environment 200, such as client device 210, network storage device 220, virtual agent creation platform 240, and/or the like.

Network 230 includes one or more wired and/or wireless networks. For example, network 230 may include a cellular network (e.g., a long-term evolution (LTE) network, a code division multiple access (CDMA) network, a 2G network, a 3G network, a 4G network, a 5G network, a new radio (NR) network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Virtual agent creation platform 240 includes one or more computing devices configured to create and/or customize a widget of a virtual agent. In some implementations, virtual agent creation platform 240 may receive a widget template that includes information relating to one or more fields of the widget and content for the one or more fields, receive a stylesheet that includes information relating to respective style identifiers of the fields, generate a markup object of the widget based on the widget template, and cause an action to be performed in connection with the markup object. In some implementations, such as when the widget is to include a static field for displaying static content and a dynamic field for displaying dynamic content, virtual agent creation platform 240 may receive a data template that includes information relating to dynamic content for the dynamic field, receive the dynamic content associated with the dynamic field, and generate the markup object based on the data template. In some implementations, virtual agent creation platform 240 may be designed to be modular such that certain software components may be swapped in or out depending on a particular need. As such, virtual agent creation platform 240 may be easily and/or quickly reconfigured for different uses. In some implementations, virtual agent creation platform 240 may receive information from and/or transmit information to client device 210, network storage device 220, rendering device 225, and/or the like.

In some implementations, virtual agent creation platform 240 may include a server device or a group of server devices. In some implementations, virtual agent creation platform 240 may be hosted in cloud computing environment 250. Notably, while implementations described herein describe virtual agent creation platform 240 as being hosted in cloud computing environment 250, in some implementations, virtual agent creation platform 240 may be non-cloud-based or may be partially cloud-based.

Cloud computing environment 250 includes an environment that delivers computing as a service, whereby shared resources, services, and/or the like may be provided to client device 210, network storage device 220, rendering device 225, and/or the like. Cloud computing environment 250 may provide computation, software, data access, storage, and/or other services that do not require end-user knowledge of a physical location and configuration of a system and/or a device that delivers the services. As shown, cloud computing environment 250 may include virtual agent creation platform 240 and computing resource 245.

Computing resource 245 includes one or more personal computers, workstation computers, server devices, or another type of computation and/or communication device. In some implementations, computing resource 245 may host virtual agent creation platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by client device 210. Application 245-1 may eliminate a need to install and execute the software applications on client device 210. For example, application 245-1 may include software associated with virtual agent creation platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., client device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
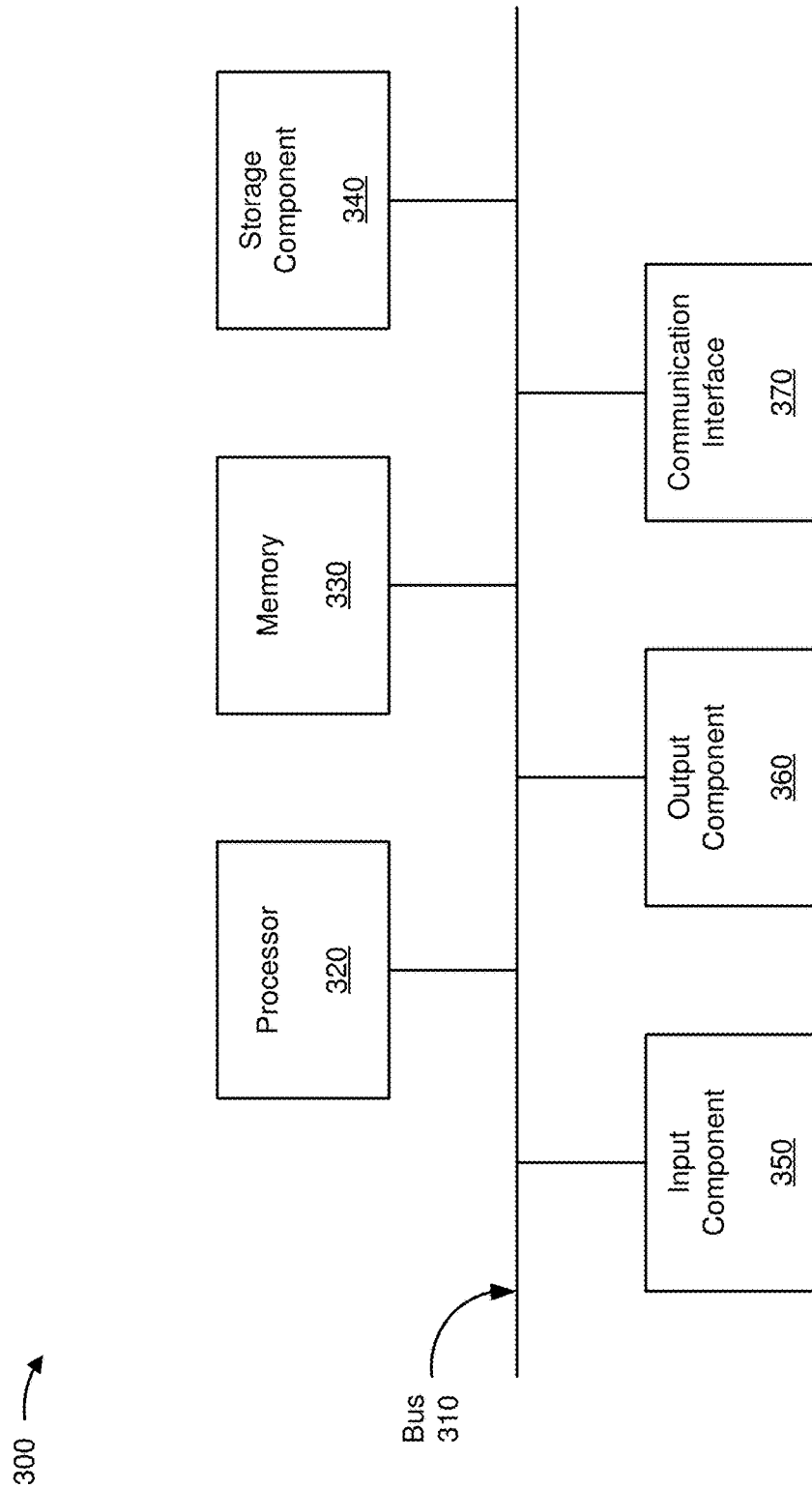
FIG. 3 is a diagram of example components of one or more devices of FIG. 2.

FIG. 3 is a diagram of example components of a device 300. Device 300 may correspond to client device 210, network storage device 220, rendering device 225, virtual agent creation platform 240, and/or computing resource 245. In some implementations, client device 210, network storage device 220, rendering device 225, virtual agent creation platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
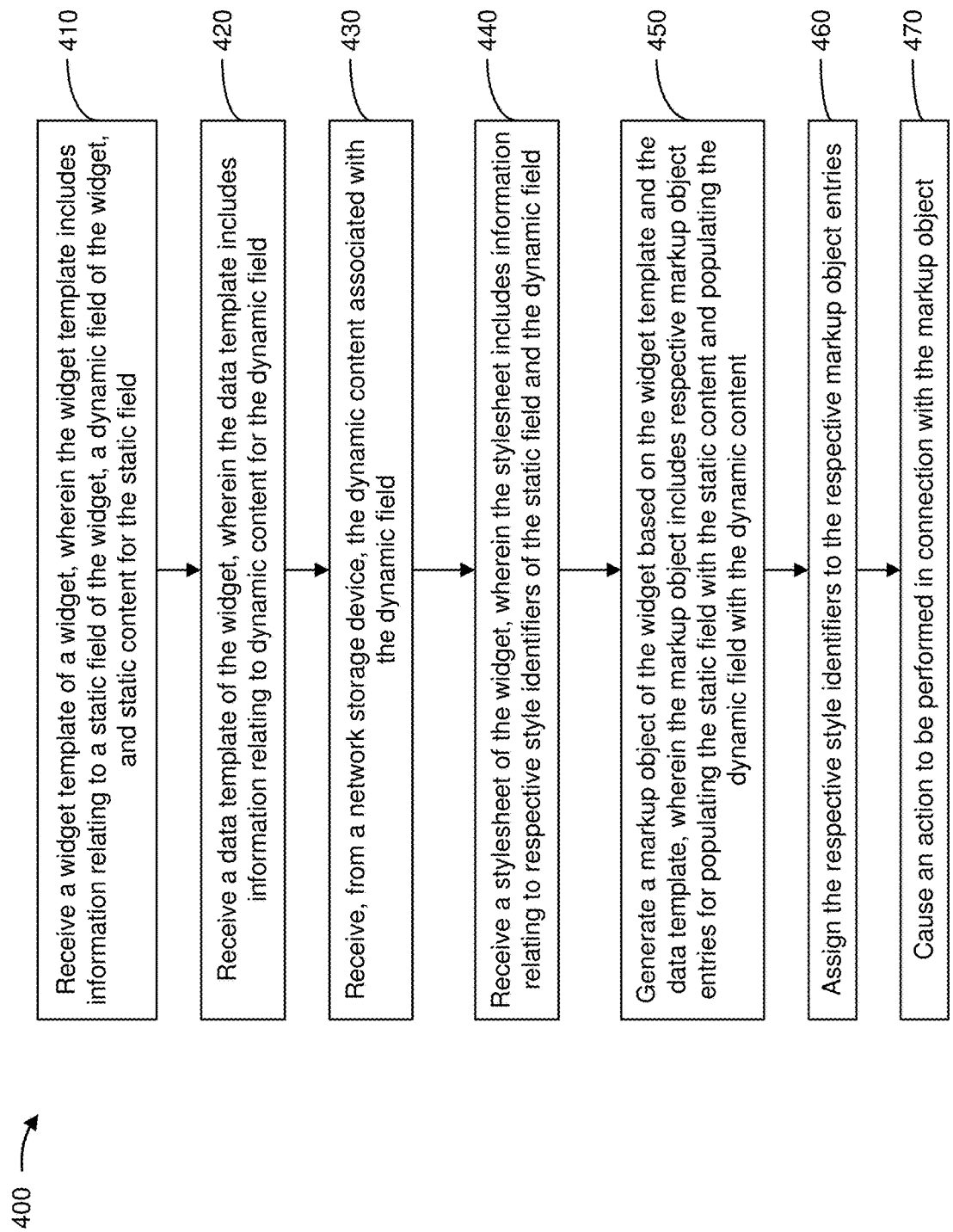
FIG. 4 is a flow chart of an example process for configuring a virtual agent.

FIG. 4 is a flow chart of an example process 400 for configuring a virtual agent. In some implementations, one or more process blocks of FIG. 4 may be performed by a virtual agent creation platform (e.g., virtual agent creation platform 240). In some implementations, one or more process blocks of FIG. 4 may be performed by another device or a group of devices separate from or including the virtual agent creation platform, such as a client device (e.g., client device 210), a network storage device (e.g., network storage device 220), or a rendering device (e.g., rendering device 225).

As shown in FIG. 4, process 400 may include receiving a widget template of a widget, wherein the widget template may include information relating to a static field of the widget, a dynamic field of the widget, and static content for the static field (block 410). For example, the virtual agent creation platform (e.g., using computer resource 245, processor 320, memory 330, storage component 340, input component 350, output component 360, communication interface 370, and/or the like) may receive a widget template of a widget, as described above. In some aspects, the widget template may include information relating to a static field of the widget, a dynamic field of the widget, and static content for the static field.

As further shown in FIG. 4, process 400 may include receiving a data template of the widget, wherein the data template may include information relating to dynamic content for the dynamic field (block 420). For example, the virtual agent creation platform (e.g., using computer resource 245, processor 320, memory 330, storage component 340, input component 350, output component 360, communication interface 370, and/or the like) may receive a data template of the widget, as described above. In some aspects, the data template may include information relating to dynamic content for the dynamic field.

As further shown in FIG. 4, process 400 may include receiving, from a network storage device, the dynamic content associated with the dynamic field (block 430). For example, the virtual agent creation platform (e.g., using computer resource 245, processor 320, memory 330, storage component 340, input component 350, output component 360, communication interface 370, and/or the like) may receive, from a network storage device, the dynamic content associated with the dynamic field, as described above.

As further shown in FIG. 4, process 400 may include receiving a stylesheet of the widget, wherein the stylesheet may include information relating to respective style identifiers of the static field and the dynamic field (block 440). For example, the virtual agent creation platform (e.g., using computer resource 245, processor 320, memory 330, storage component 340, input component 350, output component 360, communication interface 370, and/or the like) may receive a stylesheet of the widget, as described above. In some aspects, the stylesheet may include information relating to respective style identifiers of the static field and the dynamic field.

As further shown in FIG. 4, process 400 may include generating a markup object of the widget based on the widget template and the data template, wherein the markup object may include respective markup object entries for populating the static field with the static content and populating the dynamic field with the dynamic content (block 450). For example, the virtual agent creation platform (e.g., using computer resource 245, processor 320, memory 330, storage component 340, input component 350, output component 360, communication interface 370, and/or the like) may generate a markup object of the widget based on the widget template and the data template, as described above. In some aspects, the markup object may include respective markup object entries for populating the static field with the static content and populating the dynamic field with the dynamic content.

As further shown in FIG. 4, process 400 may include assigning the respective style identifiers to the respective markup object entries (block 460). For example, the virtual agent creation platform (e.g., using computer resource 245, processor 320, memory 330, storage component 340, input component 350, output component 360, communication interface 370, and/or the like) may assign the respective style identifiers to the respective markup object entries, as described above.

As further shown in FIG. 4, process 400 may include causing an action to be performed in connection with the markup object (block 470). For example, the virtual agent creation platform (e.g., using computer resource 245, processor 320, memory 330, storage component 340, input component 350, output component 360, communication interface 370, and/or the like) may cause an action to be performed in connection with the markup object, as described above.

Process 400 may include additional implementations, such as any single implementation or any combination of implementations described below and/or in connection with one or more other processes described elsewhere herein.

In a first implementation, receiving the data template may comprise receiving the data template with a data object indexing the dynamic content. In some implementations, the data object may cause the dynamic content to be received from the network storage device.

In a second implementation, alone or in combination with the first implementation, receiving the dynamic content may comprise identifying a data object of the data template, and querying the network storage device for the dynamic content associated with the data object. In some implementations, the data object may index the dynamic content.

In a third implementation, alone or in combination with one or more of the first and second implementations, receiving the stylesheet may comprise receiving the stylesheet with the respective style identifiers of the static field and the dynamic field. In some implementations, the respective style identifiers may include information relating to one or more of colors, fonts, dimensions, visual effects, or positions of the static field or the dynamic field.

In a fourth implementation, alone or in combination with one or more of the first through third implementations, causing the action to be performed may comprise transmitting the markup object to a rendering device. In some implementations, the rendering device may render the widget according to the markup object.

In a fifth implementation, alone or in combination with one or more of the first through fourth implementations, causing the action to be performed may comprise: assigning a widget identifier to the markup object; updating a widget library with the markup object; and enabling the markup object to be indexed by the widget identifier.

In a sixth implementation, alone or in combination with one or more of the first through fifth implementations, causing the action to be performed may comprise generating a graphical user interface. In some implementations, the graphical user interface may render a preview of the widget based on the markup object. In some implementations, the preview may be modifiable via the graphical user interface, and a modification of the preview may cause a corresponding modification to the markup object.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
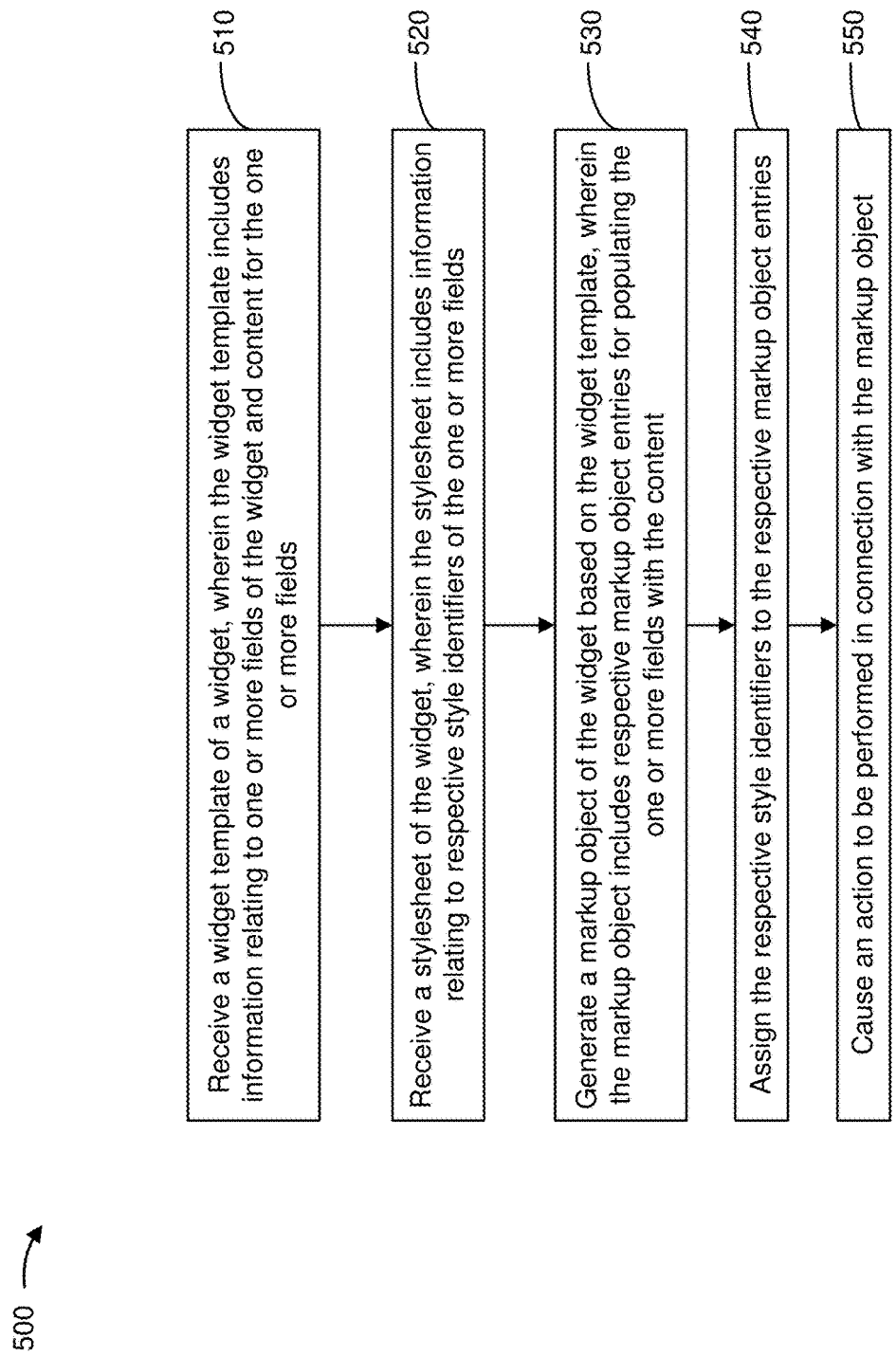
FIG. 5 is a flow chart of an example process for configuring a virtual agent.

FIG. 5 is a flow chart of an example process 500 for configuring a virtual agent. In some implementations, one or more process blocks of FIG. 5 may be performed by a virtual agent creation platform (e.g., virtual agent creation platform 240). In some implementations, one or more process blocks of FIG. 5 may be performed by another device or a group of devices separate from or including the virtual agent creation platform, such as a client device (e.g., client device 210), a network storage device (e.g., network storage device 220), or a rendering device (e.g., rendering device 225).

As shown in FIG. 5, process 500 may include receiving a widget template of a widget, wherein the widget template may include information relating to one or more fields of the widget and content for the one or more fields (block 510). For example, the virtual agent creation platform (e.g., using computer resource 245, processor 320, memory 330, storage component 340, input component 350, output component 360, communication interface 370, and/or the like) may receive a widget template of a widget, as described above. In some aspects, the widget template may include information relating to one or more fields of the widget and content for the one or more fields.

As further shown in FIG. 5, process 500 may include receiving a stylesheet of the widget, wherein the stylesheet may include information relating to respective style identifiers of the one or more fields (block 520). For example, the virtual agent creation platform (e.g., using computer resource 245, processor 320, memory 330, storage component 340, input component 350, output component 360, communication interface 370, and/or the like) may receive a stylesheet of the widget, as described above. In some aspects, the stylesheet may include information relating to respective style identifiers of the one or more fields.

As further shown in FIG. 5, process 500 may include generating a markup object of the widget based on the widget template, wherein the markup object may include respective markup object entries for populating the one or more fields with the content (block 530). For example, the virtual agent creation platform (e.g., using computer resource 245, processor 320, memory 330, storage component 340, input component 350, output component 360, communication interface 370, and/or the like) may generate a markup object of the widget based on the widget template, as described above. In some aspects, the markup object may include respective markup object entries for populating the one or more fields with the content.

As further shown in FIG. 5, process 500 may include assigning the respective style identifiers to the respective markup object entries (block 540). For example, the virtual agent creation platform (e.g., using computer resource 245, processor 320, memory 330, storage component 340, input component 350, output component 360, communication interface 370, and/or the like) may assign the respective style identifiers to the respective markup object entries, as described above.

As further shown in FIG. 5, process 500 may include causing an action to be performed in connection with the markup object (block 550). For example, the virtual agent creation platform (e.g., using computer resource 245, processor 320, memory 330, storage component 340, input component 350, output component 360, communication interface 370, and/or the like) may cause an action to be performed in connection with the markup object, as described above.

Process 500 may include additional implementations, such as any single implementation or any combination of implementations described below and/or in connection with one or more other processes described elsewhere herein.

In a first implementation, receiving the widget template may comprise receiving the widget template of a virtual agent widget. In some implementations, the one or more fields may relate to an automated response of a virtual agent.

In a second implementation, alone or in combination with the first implementation, receiving the stylesheet may comprise receiving the stylesheet with the respective style identifiers of the one or more fields. In some implementations, the respective style identifiers may include information relating to one or more of colors, fonts, dimensions, visual effects, or positions of the one or more fields.

In a third implementation, alone or in combination with one or more of the first and second implementations, assigning the respective style identifiers to the respective markup object entries may comprise assigning the respective style identifiers to the respective markup object entries in a format that enables a rendering device to render the widget based on the markup object.

In a fourth implementation, alone or in combination with one or more of the first through third implementations, causing the action to be performed may comprise transmitting the markup object to a rendering device. In some implementations, the rendering device may render the widget according to the markup object.

In a fifth implementation, alone or in combination with one or more of the first through fourth implementations, causing the action to be performed may comprise: assigning a widget identifier to the markup object; updating a widget library with the markup object; and enabling the markup object to be indexed by the widget identifier.

In a sixth implementation, alone or in combination with one or more of the first through fifth implementations, causing the action to be performed may comprise generating a graphical user interface. In some implementations, the graphical user interface may render a preview of the widget based on the markup object. In some implementations, the preview may be modifiable via the graphical user interface, and a modification of the preview may cause a corresponding modification to the markup object.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
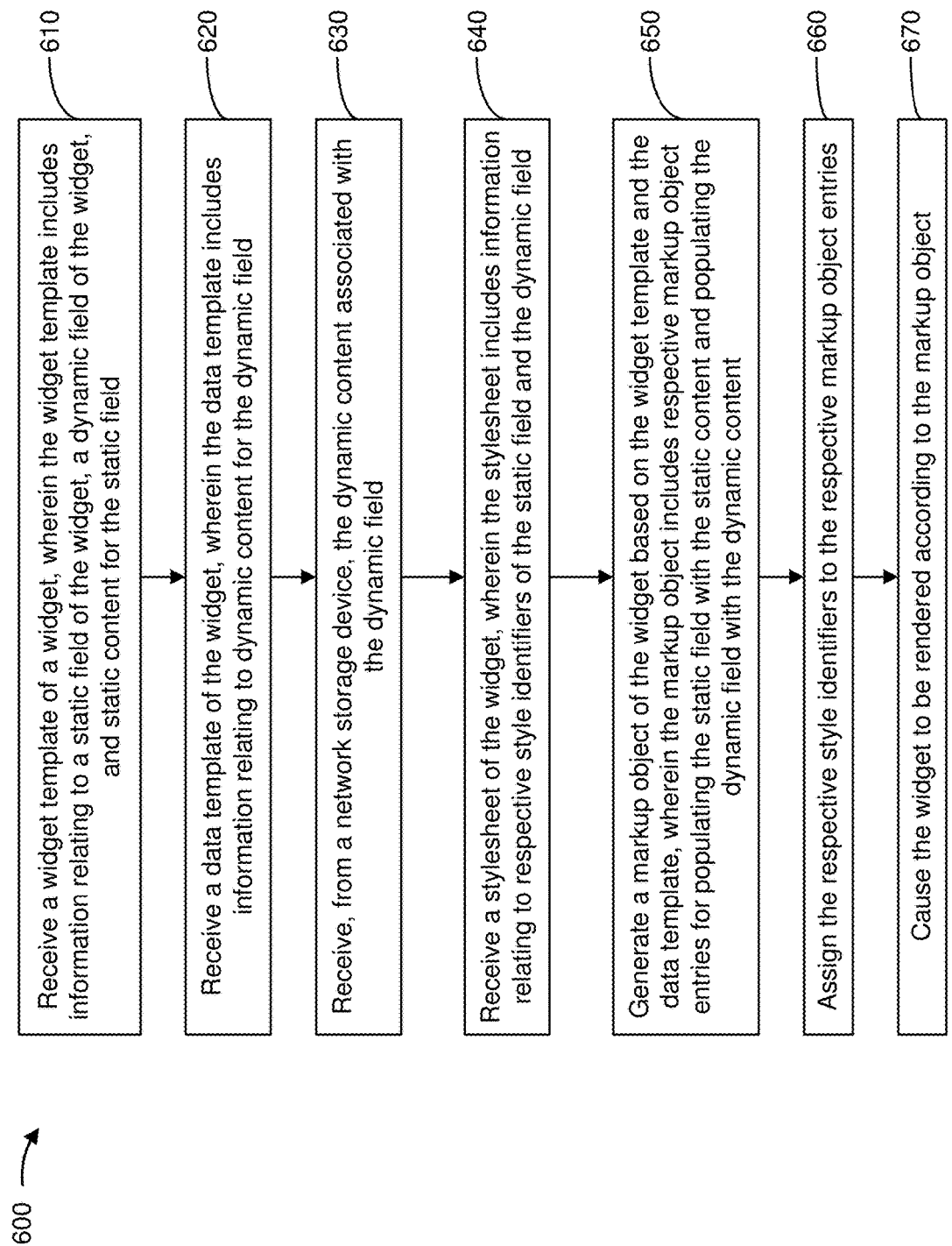
FIG. 6 is a flow chart of an example process for configuring a virtual agent.

FIG. 6 is a flow chart of an example process 600 for configuring a virtual agent. In some implementations, one or more process blocks of FIG. 6 may be performed by a virtual agent creation platform (e.g., virtual agent creation platform 240). In some implementations, one or more process blocks of FIG. 6 may be performed by another device or a group of devices separate from or including the virtual agent creation platform, such as a client device (e.g., client device 210), a network storage device (e.g., network storage device 220), or a rendering device (e.g., rendering device 225).

As shown in FIG. 6, process 600 may include receiving a widget template of a widget, wherein the widget template may include information relating to a static field of the widget, a dynamic field of the widget, and static content for the static field (block 610). For example, the virtual agent creation platform (e.g., using computer resource 245, processor 320, memory 330, storage component 340, input component 350, output component 360, communication interface 370, and/or the like) may receive a widget template of a widget, as described above. In some aspects, the widget template may include information relating to a static field of the widget, a dynamic field of the widget, and static content for the static field.

As further shown in FIG. 6, process 600 may include receiving a data template of the widget, wherein the data template may include information relating to dynamic content for the dynamic field (block 620). For example, the virtual agent creation platform (e.g., using computer resource 245, processor 320, memory 330, storage component 340, input component 350, output component 360, communication interface 370, and/or the like) may receive a data template of the widget, as described above. In some aspects, the data template may include information relating to dynamic content for the dynamic field.

As further shown in FIG. 6, process 600 may include receiving, from a network storage device, the dynamic content associated with the dynamic field (block 630). For example, the virtual agent creation platform (e.g., using computer resource 245, processor 320, memory 330, storage component 340, input component 350, output component 360, communication interface 370, and/or the like) may receive, from a network storage device, the dynamic content associated with the dynamic field, as described above.

As further shown in FIG. 6, process 600 may include receiving a stylesheet of the widget, wherein the stylesheet may include information relating to respective style identifiers of the static field and the dynamic field (block 640). For example, the virtual agent creation platform (e.g., using computer resource 245, processor 320, memory 330, storage component 340, input component 350, output component 360, communication interface 370, and/or the like) may receive a stylesheet of the widget, as described above. In some aspects, the stylesheet may include information relating to respective style identifiers of the static field and the dynamic field.

As further shown in FIG. 6, process 600 may include generating a markup object of the widget based on the widget template and the data template, wherein the markup object may include respective markup object entries for populating the static field with the static content and populating the dynamic field with the dynamic content (block 650). For example, the virtual agent creation platform (e.g., using computer resource 245, processor 320, memory 330, storage component 340, input component 350, output component 360, communication interface 370, and/or the like) may generate a markup object of the widget based on the widget template and the data template, as described above. In some aspects, the markup object may include respective markup object entries for populating the static field with the static content and populating the dynamic field with the dynamic content.

As further shown in FIG. 6, process 600 may include assigning the respective style identifiers to the respective markup object entries (block 660). For example, the virtual agent creation platform (e.g., using computer resource 245, processor 320, memory 330, storage component 340, input component 350, output component 360, communication interface 370, and/or the like) may assign the respective style identifiers to the respective markup object entries, as described above.

As further shown in FIG. 6, process 600 may include causing the widget to be rendered according to the markup object (block 670). For example, the virtual agent creation platform (e.g., using computer resource 245, processor 320, memory 330, storage component 340, input component 350, output component 360, communication interface 370, and/or the like) may cause the widget to be rendered according to the markup object, as described above.

Process 600 may include additional implementations, such as any single implementation or any combination of implementations described below and/or in connection with one or more other processes described elsewhere herein.

In a first implementation, receiving the widget template may comprise receiving the widget template of a virtual agent widget. In some implementations, the static field and the dynamic field may relate to an automated response of a virtual agent.

In a second implementation, alone or in combination with the first implementation, receiving the data template may comprise receiving the data template with a data object indexing the dynamic content. In some implementations, the data object may cause the dynamic content to be received from the network storage device.

In a third implementation, alone or in combination with one or more of the first and second implementations, receiving the stylesheet may comprise receiving the stylesheet with the respective style identifiers of the static field and the dynamic field. In some implementations, the respective style identifiers may include information relating to one or more of colors, fonts, dimensions, visual effects, or positions of the static field or the dynamic field.

In a fourth implementation, alone or in combination with one or more of the first through third implementations, generating the markup object may comprise populating the static field with the static content, and populating the dynamic field with the dynamic content. In some implementations, the dynamic content may be populated in real-time based on a data object embedded in the data template.

In a fifth implementation, alone or in combination with one or more of the first through fourth implementations, assigning the respective style identifiers to the respective markup object entries may comprise assigning the respective style identifiers to the respective markup object entries in a format that enables a rendering device to render the widget based on the markup object.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are illustrative views of one or more example implementations 700 described herein. As shown in FIGS. 7A-7D, the example implementation(s) 700 may be used to configure a virtual agent 710 and/or one or more widgets 720 of virtual agent 710. According to systems and methods described above, widgets 720 may include one or more elements 730 that can be configured using a widget template 740, a data template 750, and/or a stylesheet 760. Although FIGS. 7A-7D show one or more examples of virtual agent 710 and widgets 720, it will be apparent that other variations or alternatives of virtual agent 710 and/or widgets 720 can be configured using systems and/or methods described herein.

Figure 7A:
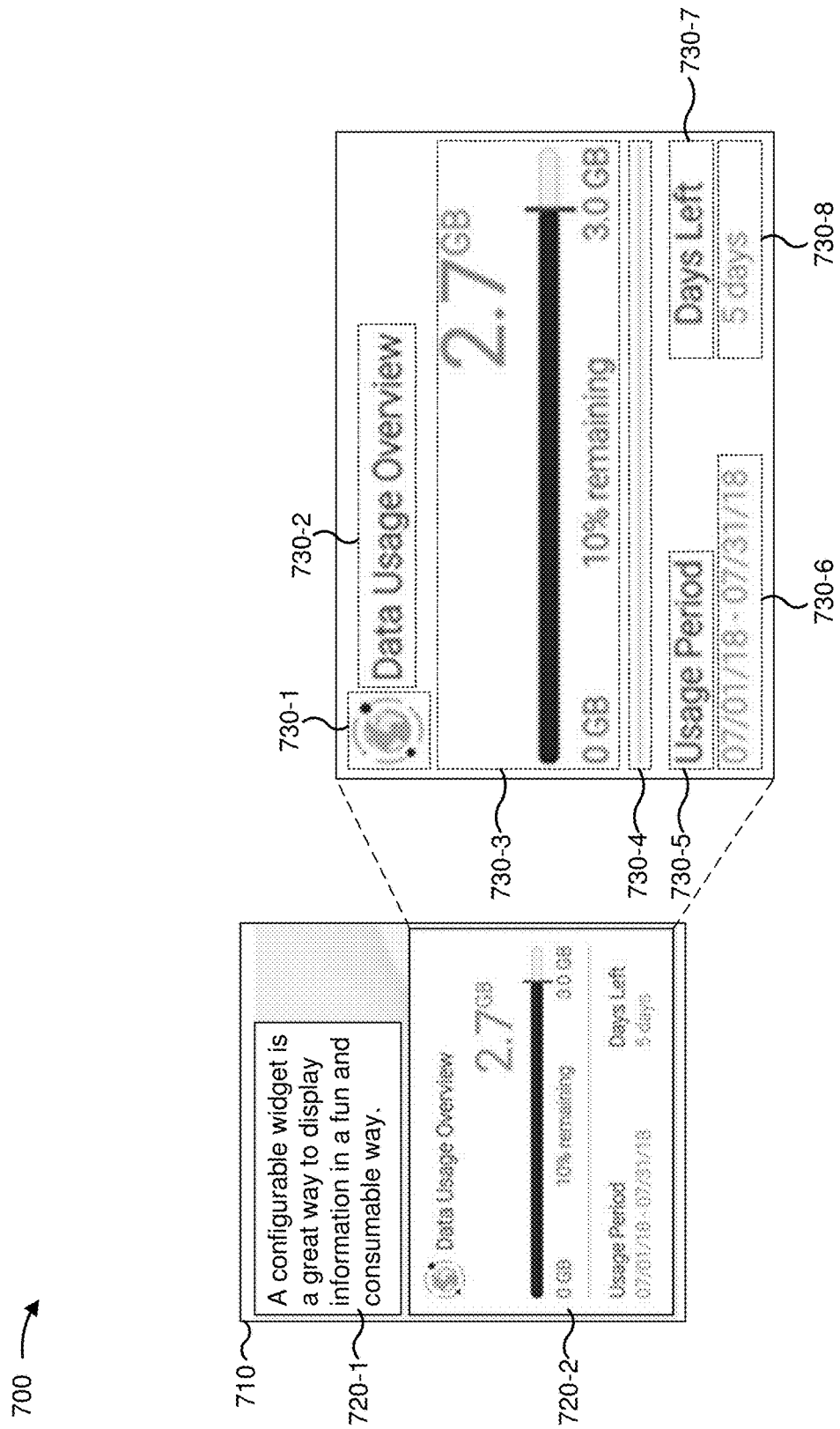
FIGS. 7A-7D are illustrative views of one or more example implementations described herein.

As shown in FIG. 7A, virtual agent 710 may include one or more widgets 720 which provide content for virtual agent 710. In some examples, widgets 720 may correspond to an automated response (e.g., a message within a messaging interface and/or the like) that is generated by virtual agent 710 in response to a query by a user of virtual agent 710. Widgets 720 of virtual agent 710 may be configured to include a simple text or other static content (e.g., as shown by widget 720-1) or configured to display a combination of static and dynamic content (e.g., as shown by widget 720-2). In the example shown in FIG. 7A, widget 720-2 may be configured to present information relating to a data usage of a user. Widget 720-2 may include an image element 730-1 for displaying an icon associated with widget 720-2, a text element 730-2 for displaying a title of widget 720-2 (e.g., "Data Usage Overview"), a progress element 730-3 for displaying a progress bar corresponding to the data usage, a divider element 730-4 for displaying a divider within widget 720-2, a text element 730-5 for displaying a label of the usage period (e.g., "Usage Period"), a text element 730-6 for displaying a date range of the usage period (e.g., "Jul. 1, 2018-Jul. 31, 2018"), a text element 730-7 for displaying a label of a number of days left in the usage period (e.g., "Days Left"), and a text element 730-8 for displaying the number of the days left (e.g., "5 days").

In some implementations, elements 730 may be defined in a stylable markup format (e.g., a CSS format, an HTML format, an XML format, and/or another standard format) that a rendering device (e.g., a device supporting a web-based application, a proprietary application of a proprietary system, and/or another rendering application) can parse and display. Elements 730 may be defined according to content, style, and/or position relative to widget 720 and/or other elements 730 within widget 720. Content may be defined in terms of fields (e.g., text element 730-2 may have a single text field, while progress element 730-3 may have a lower bound field, an upper bound field, and a current progress field). Furthermore, a field may be defined to be static or dynamic. A static field may be defined for content that is to remain unchanged per instance or appearance within widget 720, while a dynamic field may be defined for content that may vary per instance or appearance within widget 720. For example, the text field of text element 730-5 may be defined as a static field because the corresponding label (e.g., "Usage Period") remains unchanged irrespective of time or other variables, whereas the current progress field of progress element 730-3 may be defined as a dynamic field because the corresponding progress bar may change over time.

Figure 7B:
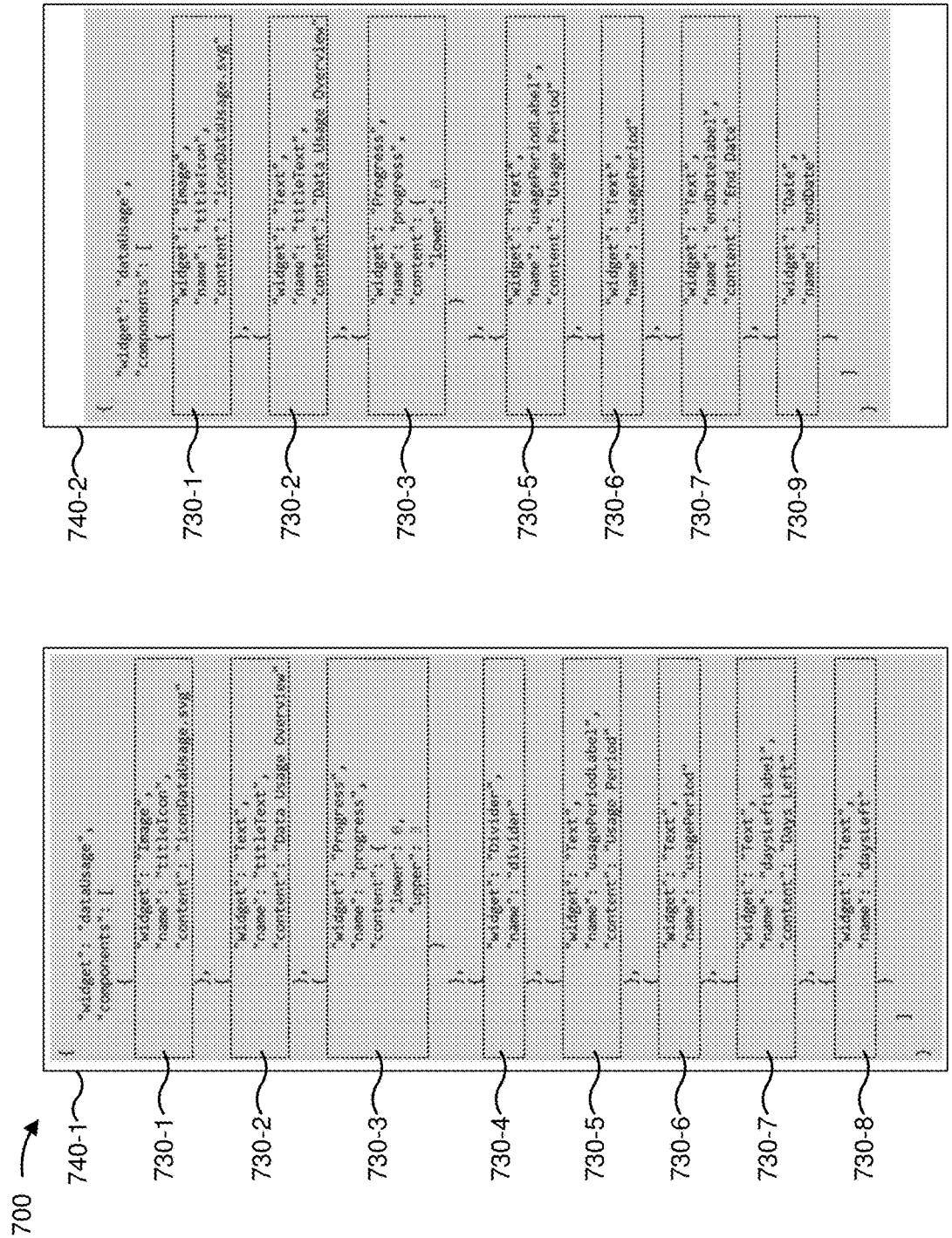

As shown in FIG. 7B, one or more elements 730 of widget 720-2 may be defined using a widget template 740 (e.g., provided in a JSON format, a YAML format, an XML format, and/or another standard key-value format). Widget template 740 may list elements 730 to be included in widget 720-2, assign respective unique identifiers (e.g., names) to elements 730, and define respective content for static fields. For example, text element 730-5 may be assigned a unique identifier (e.g., "usagePeriodLabel") and defined with a static field (e.g., "Usage Period"). In some examples, assigning content or value to a particular element 730 may automatically designate the element 730 as a static field. As further shown in FIG. 7B, widget template 740 may be modified to specify different combinations of elements 730 that may be desired for widget 720-2. For example, a first widget template 740-1 of FIG. 7B includes elements 730 arranged according to widget 720-2 of FIG. 7A. In contrast, a second widget template 740-2 of FIG. 7B omits divider element 730-4 and text element 730-8, and modifies progress element 730-3 by removing the upper bound field (e.g., to enable the upper bound field to be designated as a dynamic field). Furthermore, second widget template 740-2 modifies text element 730-7 to display an end date (e.g., "End Date") rather than the number of days left, and introduces a date element 730-9 for displaying a date corresponding to the end date.

Figure 7C:
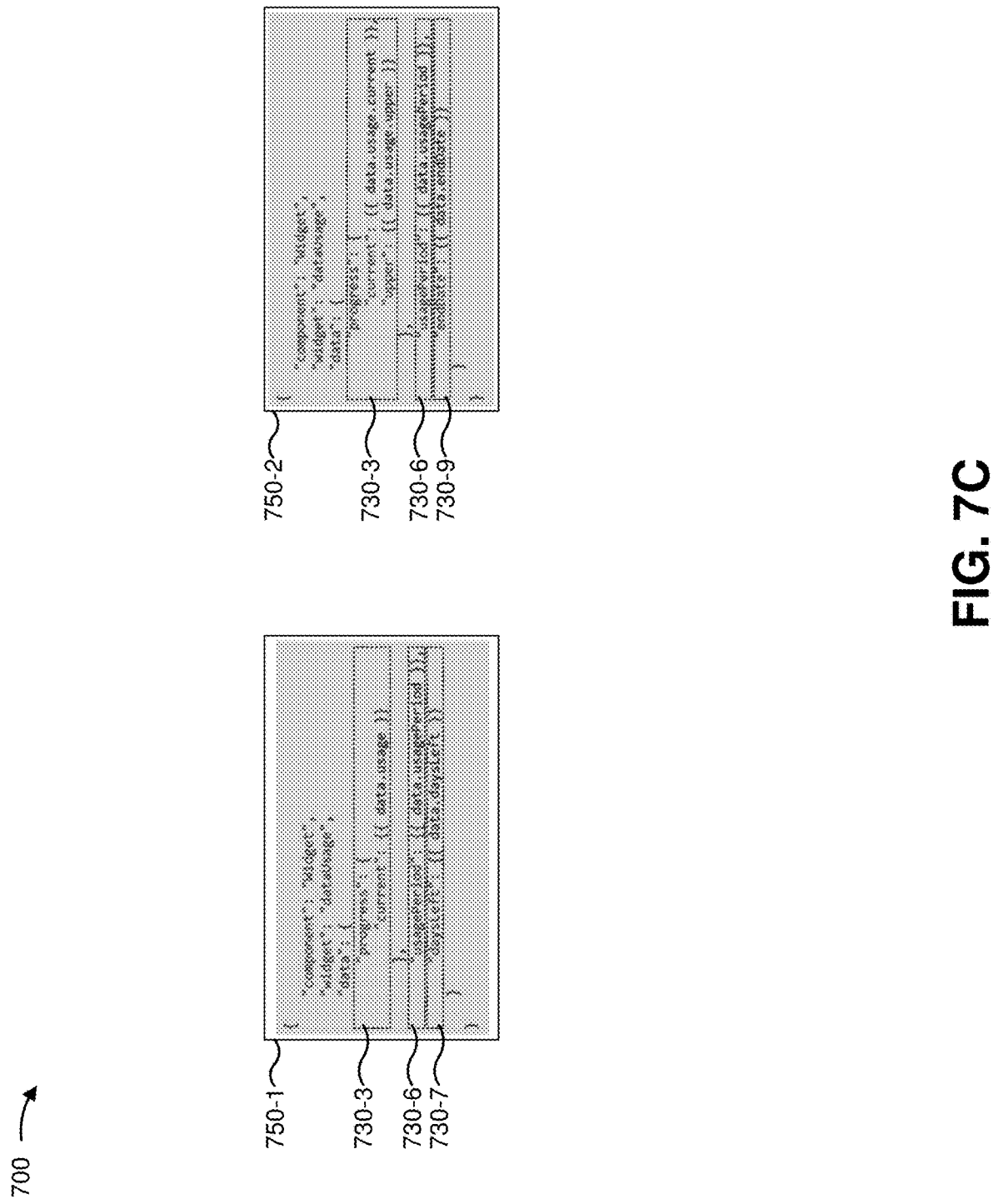

As shown in FIG. 7C, dynamic fields of one or more elements 730 of widget 720-2 may be defined using a data template 750 (e.g., provided in a JSON format, a YAML format, an XML format, and/or another standard key-value format). For example, a first data template 750-1 may define dynamic counterparts to elements 730 defined by first widget template 740-1 of FIG. 7B, and a second data template 750-2 may define dynamic counterparts to elements 730 defined by second widget template 740-2 of FIG. 7B. As shown, first data template 750-1 may define the current progress field of progress element 730-3, the dates corresponding to the usage period of text element 730-6, and the number of days left associated with text element 730-7. Second data template 750-2 may define the current progress field and the upper bound field of progress element 730-3, the dates corresponding to the usage period of text element 730-6, and the end date associated with text element 730-9. As further shown in FIG. 7C, data templates 750 may include or embed respective data objects (e.g., "data.usage," "data.usagePeriod," "data.daysLeft," "data.usage.current," "data.usage.upper," "data.endDate," and/or the like) for elements 730. The data objects may be used to fetch corresponding data from a data source, resolve the dynamic fields to the corresponding data, and/or update the dynamic field intermittently, periodically, or continuously in real-time.

Figure 7D:
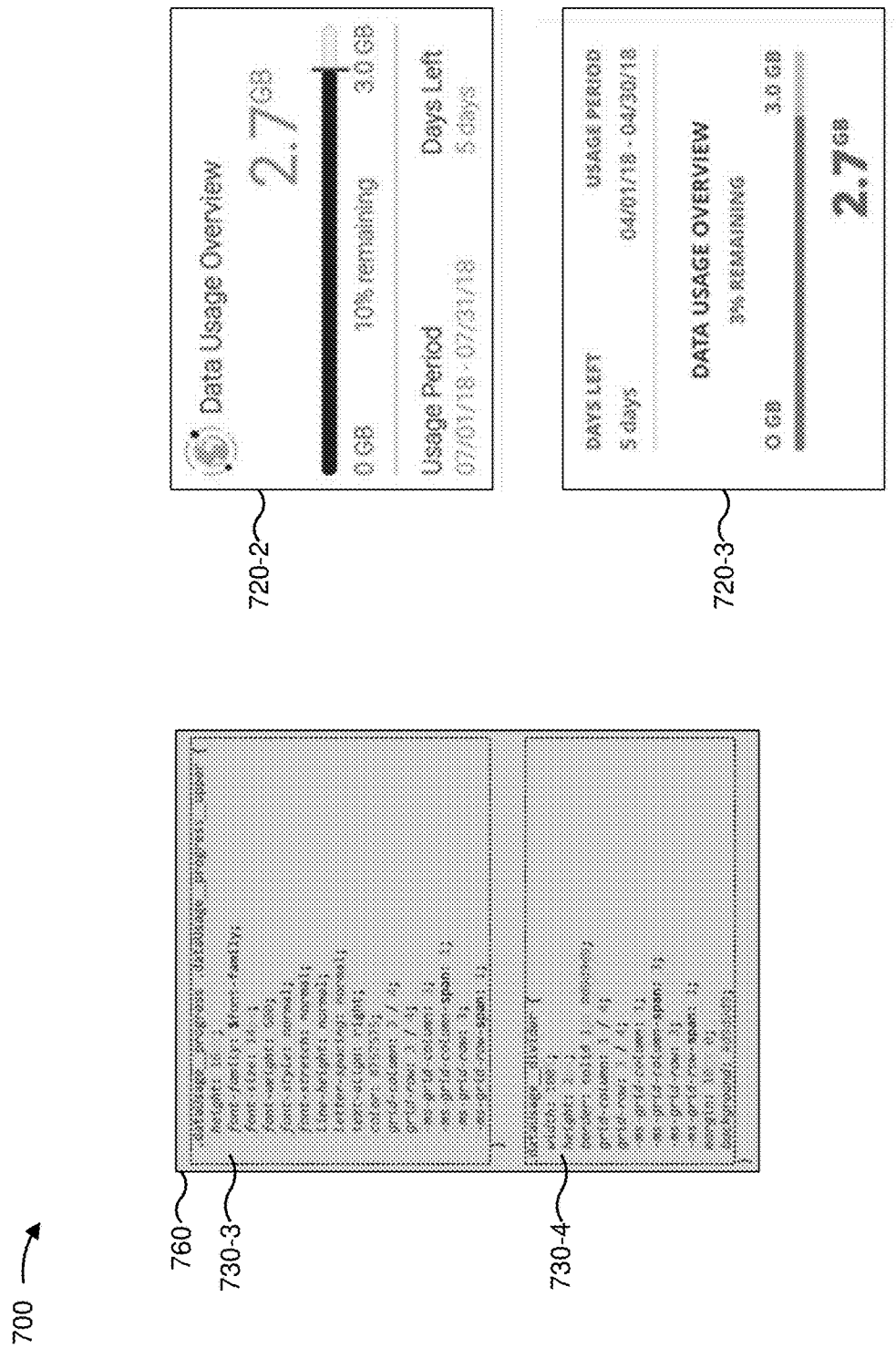

As shown in FIG. 7D, style rulesets for one or more elements 730 of widget 720-2 may be defined using a stylesheet 760 (e.g., provided in a CSS format, an HTML format, an XML format, and/or another standard markup format). Style rulesets may define a set of design parameters (e.g., colors, fonts, dimensions, visual effects, positions, and/or other design attributes) to be used to render elements 730 according to a desired style and/or arrangement. In some examples, stylesheet 760 may use a grid system, a coordinate system, and/or another positioning system that may be supported by stylesheet 760 and/or an intended rendering device. As partially shown in the example of FIG. 7D, stylesheet 760 may include a first style ruleset for progress element 730-3 of widget 720-2 and a second style ruleset for divider element 730-4 of widget 720-2. Moreover, stylesheet 760 may be configured such that simple modifications made within stylesheet 760 can produce a wide variety of different styles of widget 720-2 without adversely affecting the content provided within widget 720-2. For example, stylesheet 760 may be used to provide widget 720-2 as shown in FIGS. 7A and 7D, or modified to provide a different widget 720-3 as shown in FIG. 7D.

As further shown in FIG. 7D, stylesheet 760 may assign respective style identifiers to the style rulesets. For example, a style identifier may be assigned to a style ruleset using a naming scheme that uniquely identifies a particular widget 720 and/or a particular element 730 within widget 720 in a manner that avoids naming conflicts (e.g., such as when using multiple widgets 720 and/or multiple elements 730). In some examples, the naming scheme may assign a style identifier by prefixing an identifier of a particular element 730 with an identifier of an associated widget 720. For example, a style identifier (e.g., "dataUsage_usagePeriodLabel") may be assigned to a style ruleset of text element 730-5 of widget 720-2 based on the identifier of text element 730-5 (e.g., "usagePeriodLabel") and the identifier of widget 720-2 (e.g., "dataUsage") as defined by widget template 740. Accordingly, the naming scheme may be configured such that a style ruleset that is assigned a style identifier (e.g., "dataUsage_usagePeriodLabel") applies only to the identified element 730 (e.g., text element 730-5) of the identified widget 720 (e.g., widget 720-2) and to no other element 730 and/or widget 720.

In some implementations, such as when using a CSS markup format or an HTML markup format, a style identifier may be assigned to an upper-level style ruleset based on an identifier and/or a type of a corresponding element 730. For example, an upper-level style ruleset for a particular element 730 of a particular widget 720 may be assigned a style identifier according to a naming scheme defined by:

[widget name]_[element type], or

[widget name]_[element name as provided by widget template].

According to the naming scheme, a style identifier of an upper-level style ruleset for image element 730-1 (e.g., that is an image type and named "titleIcon") of widget 720-2 (e.g., named "dataUsage") may be defined by a first style identifier (e.g., "dataUsage_image") or a second style identifier (e.g., "dataUsage_titleIcon"). If widget 720-2 includes more than one image element 730-1, the first style ruleset (e.g., "dataUsage_image") may apply to all elements 730 that are of the image type, while the second style ruleset (e.g., "dataUsage_titleIcon") may apply only to the named image element 130-1. Furthermore, the prefix (e.g., "dataUsage") may ensure that the style ruleset applies only to the named widget 720-2. In some examples, the naming scheme may similarly be used to assign style identifiers for lower-level style rulesets (e.g., style rulesets for sub-elements or attributes within respective elements 730).

As indicated above, FIGS. 7A-7D are provided as one or more examples. Other examples can differ from what is described with regard to FIGS. 7A-7D.

Figure 8:
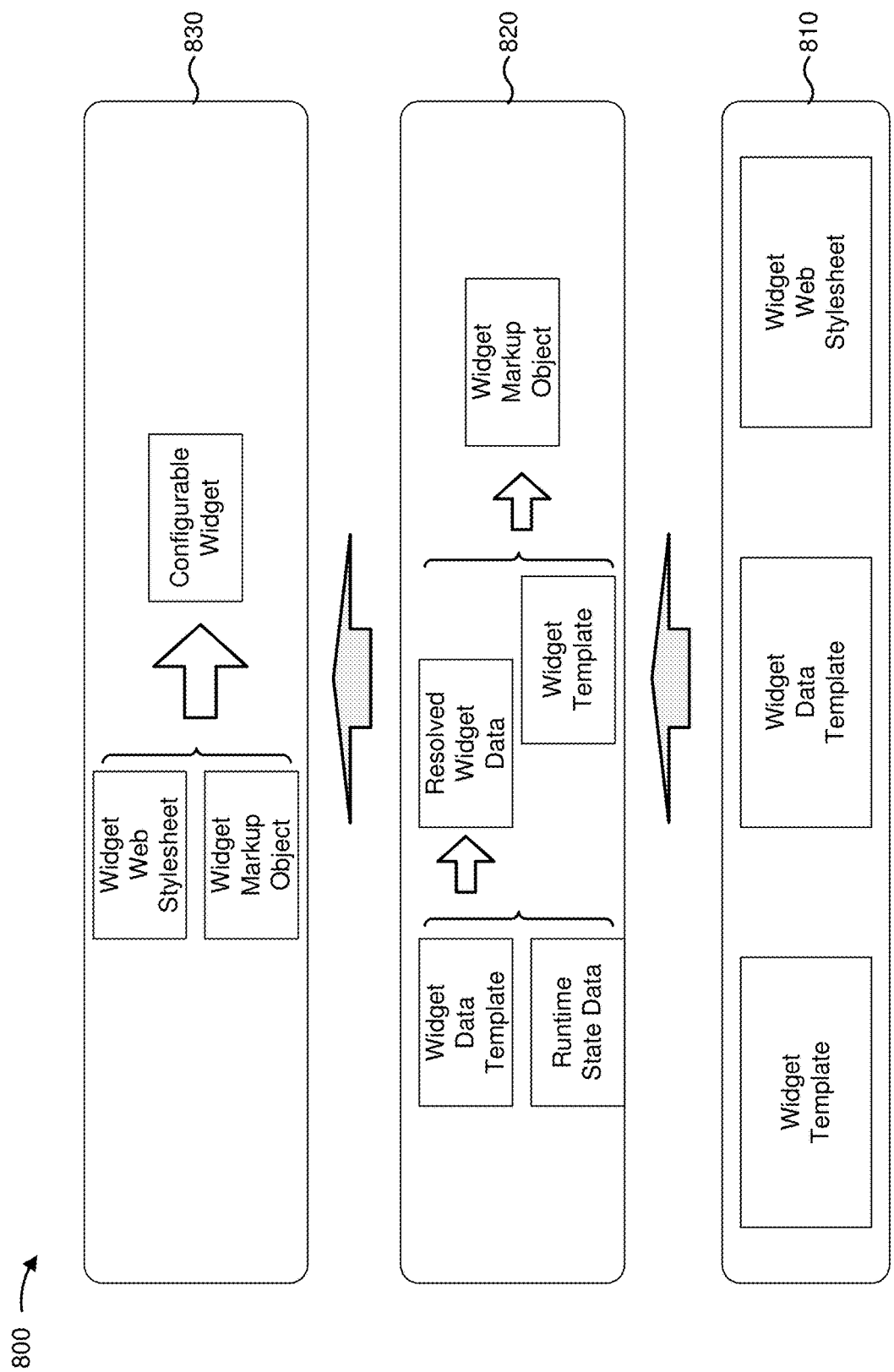
FIG. 8 is a diagram of an example framework described herein.

FIG. 8 is a diagram of an example framework 800 described herein. As shown in FIG. 8, the example framework 800 may be used to create a configurable widget of a virtual agent, and cause the widget to be rendered by a rendering device (e.g., a device supporting a web browser application, a web-based application, and/or another rendering application). Although FIG. 8 shows one example framework 800 that can be used in connection with systems and/or methods described herein, it will be apparent that other variations or alternatives of framework 800 is possible.

As shown in FIG. 8, framework 800 may include a design segment 810, a back-end segment 820, and a front-end segment 830. Design segment 810 may define an environment (e.g., supported by a client device and/or the like) within which a user (e.g., a developer, a programmer, a designer, and/or the like) may create a widget template, a data template, and a stylesheet for a widget. The widget template may define one or more elements of the widget and include information relating to static fields of the widget, static content for the static fields, and dynamic fields of the widget, as described above. The data template may define dynamic content (e.g., data objects) for the dynamic fields defined by the widget template, as described above. The stylesheet may define style rulesets for the static fields and dynamic fields defined by the widget template, as described above. In some examples, such as if dynamic content is not desired for the widget, the data template may be omitted.

As further shown in FIG. 8, a back-end segment 820 of framework 800 may define an environment (e.g., supported by a server device, a data structure device, and/or the like) within which a markup object of the widget may be created. For example, back-end segment 820 may support runtime state data that includes and/or otherwise has access to dynamic content referenced by the dynamic fields (e.g., via the data objects) of the data template. The runtime state data may be combined with the data template to create resolved widget data (e.g., the data objects of the dynamic fields that have been resolved to the corresponding dynamic content). Furthermore, the widget template may be combined with the resolved widget data to create the markup object of the widget. For example, the markup object may define one or more markup object entries corresponding to one or more elements (e.g., static fields and/or dynamic fields) defined by the widget template.

As further shown in FIG. 8, a front-end segment 830 of framework 800 may define an environment within which a rendering device (e.g., a device supporting a web browser application, a web-based application, and/or another rendering application) may render the widget. For example, the rendering device may use the stylesheet created within design segment 810 and the markup object created within back-end segment 820 to apply the respective style rulesets to the elements of the widget. The rendering device may further enable the widget to be displayed within a virtual agent to a user interacting with the virtual agent (e.g., via a client device and/or the like).

As indicated above, FIG. 8 is provided as an example. Other examples can differ from what is described with regard to FIG. 8.

Figure 9:
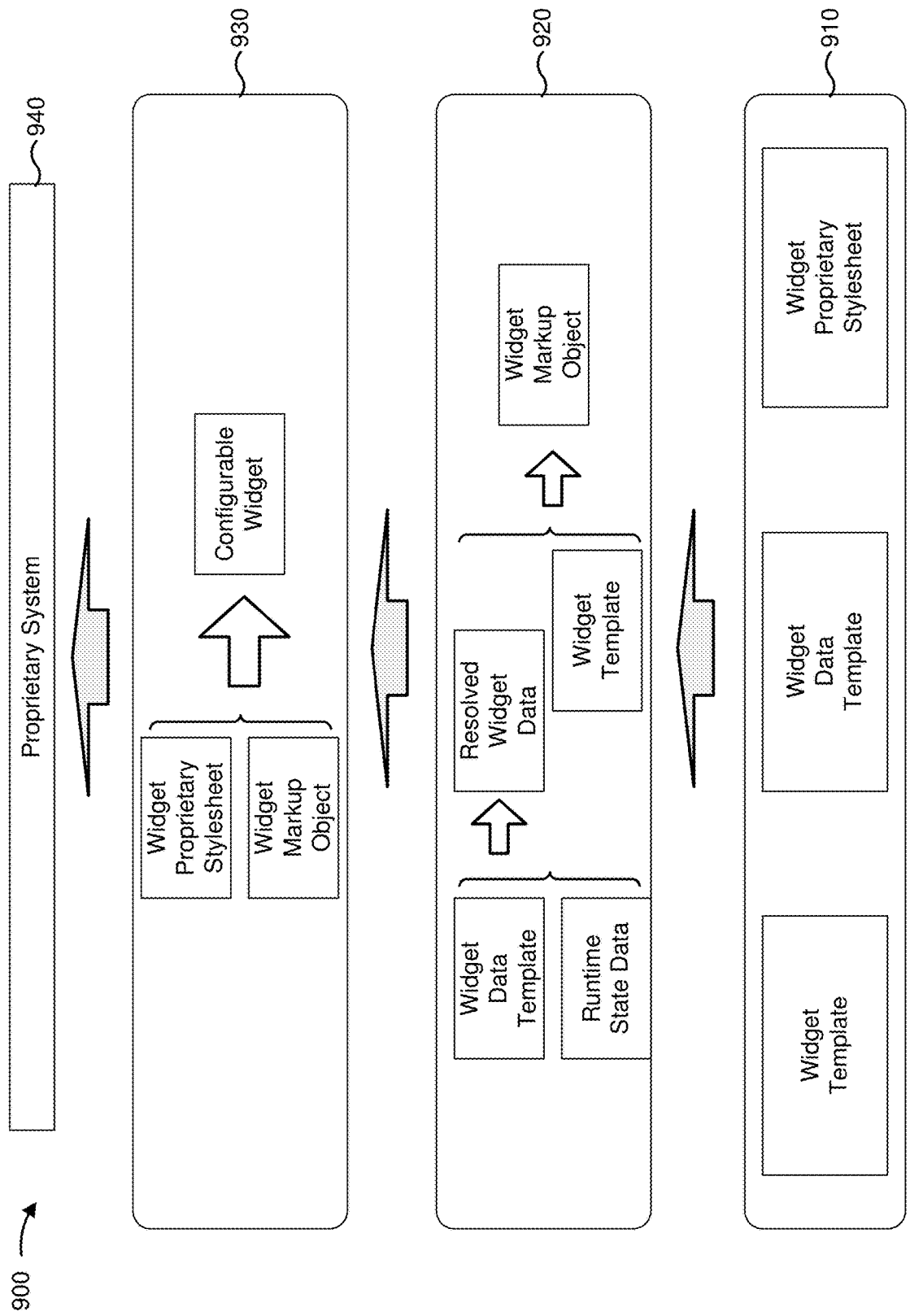
FIG. 9 is a diagram of an example framework described herein.

FIG. 9 is a diagram of an example framework 900 described herein. As shown in FIG. 9, the example framework 900 may be used to create a configurable widget of a virtual agent, and cause the widget to be rendered by a rendering device (e.g., a proprietary system, a device supporting a proprietary application of a proprietary system, and/or another rendering application). Although FIG. 9 shows one example framework 900 that can be used in connection with systems and/or methods described herein, it will be apparent that other variations or alternatives of framework 900 is possible.

As shown in FIG. 9, framework 900 may include a design segment 910, a first back-end segment 920, a second back-end segment 930, and a proprietary system 940. Design segment 910 may define an environment (e.g., supported by a client device and/or the like) within which a user (e.g., a developer, a programmer, a designer, and/or the like) may create a widget template, a data template, and a stylesheet for a widget. The widget template may define one or more elements of the widget and include information relating to static fields of the widget, static content for the static fields, and dynamic fields of the widget, as described above. The data template may define dynamic content (e.g., data objects) for the dynamic fields defined by the widget template, as described above. The stylesheet may define style rulesets for the static fields and dynamic fields defined by the widget template, as described above. In some examples, such as if dynamic content is not desired for the widget, the data template may be omitted.

As further shown in FIG. 9, a first back-end segment 920 of framework 900 may define an environment (e.g., supported by a server device, a data structure device, and/or the like) within which a markup object of the widget may be created. For example, first back-end segment 920 may support runtime state data that includes and/or otherwise has access to dynamic content referenced by the dynamic fields (e.g., via the data objects) of the data template. The runtime state data may be combined with the data template to create resolved widget data (e.g., the data objects of the dynamic fields that have been resolved to the corresponding dynamic content). Furthermore, the widget template may be combined with the resolved widget data to create the markup object of the widget. For example, the markup object may define one or more markup object entries corresponding to one or more elements (e.g., static fields and/or dynamic fields) defined by the widget template.

As further shown in FIG. 9, a second back-end segment 930 of framework 900 may define an environment (e.g., supported by a server device, a data structure device, and/or the like) within which the widget may be rendered. For example, the stylesheet created within design segment 910 may be used to apply the respective style rulesets of the elements of the widget to the markup object created within first back-end segment 920. In contrast to front-end segment 830 of FIG. 8, which may be adapted for a web browser application and/or another web-based application, second back-end segment 930 of FIG. 9 may enable the widget to be rendered for a proprietary application of proprietary system 940 that may or may not be web-based. Based on the widget rendered within the second back-end segment 930, proprietary system 940 may enable the widget to be displayed to a user accessing the proprietary application (e.g., via a client device and/or the like).

As indicated above, FIG. 9 is provided as an example. Other examples can differ from what is described with regard to FIG. 9.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a widget template of a widget,
      wherein the widget template includes information relating to a static field of the widget, a dynamic field of the widget, and static content for the static field;
   receiving, by the device, a data template of the widget,
      wherein the data template includes information relating to dynamic content for the dynamic field;
   receiving, by the device and from a network storage device, the dynamic content associated with the dynamic field;
   receiving, by the device, a stylesheet of the widget,
      wherein the stylesheet includes information relating to respective style identifiers of the static field and the dynamic field, and
      wherein the stylesheet uses a naming scheme which includes information that defines the respective style identifiers by appending a corresponding style ruleset with information identifying the widget;
   generating, by the device, a markup object of the widget based on the widget template and the data template,
      wherein the markup object includes respective markup object entries for populating the static field with the static content and populating the dynamic field with the dynamic content;
   assigning, by the device, the respective style identifiers to the respective markup object entries based on the naming scheme; and
   causing, by the device, an action to be performed in connection with the markup object.

2. The method of claim 1, wherein receiving the data template comprises:
   receiving the data template with a data object indexing the dynamic content,
      wherein the data object is to cause the dynamic content to be received from the network storage device.

3. The method of claim 1, wherein receiving the dynamic content comprises:
   identifying a data object of the data template,
      wherein the data object indexes the dynamic content; and
   querying the network storage device for the dynamic content associated with the data object.

4. The method of claim 1, wherein receiving the stylesheet comprises:
   receiving the stylesheet with the respective style identifiers of the static field and the dynamic field,
      wherein the respective style identifiers include information relating to one or more of colors, fonts, dimensions, visual effects, or positions of the static field or the dynamic field.

5. The method of claim 1, wherein causing the action to be performed comprises:
   transmitting the markup object to a rendering device,
      wherein the rendering device renders the widget according to the markup object.

6. The method of claim 1, wherein causing the action to be performed comprises:
   assigning a widget identifier to the markup object;
   updating a widget library with the markup object; and
   enabling the markup object to be indexed by the widget identifier.

7. The method of claim 1, wherein causing the action to be performed comprises:
  generating a graphical user interface,
    wherein the graphical user interface renders a preview of the widget based on the markup object,
    wherein the preview is modifiable via the graphical user interface, and
    wherein a modification of the preview causes a corresponding modification to the markup object.

8. A device, comprising:
  one or more memories; and
  one or more processors, communicatively coupled to the one or more memories, to:
    receive a widget template of a widget,
      wherein the widget template includes information relating to one or more fields of the widget and content for the one or more fields;
    receive a stylesheet of the widget,
      wherein the stylesheet includes information relating to respective style identifiers of the one or more fields, and
      wherein the stylesheet uses a naming scheme which includes information that defines the respective style identifiers by appending a corresponding style ruleset with information identifying the widget;
    generate a markup object of the widget based on the widget template,
      wherein the markup object includes respective markup object entries for populating the one or more fields with the content;
    assign the respective style identifiers to the respective markup object entries based on the naming scheme; and
    cause an action to be performed in connection with the markup object.

9. The device of claim 8, wherein the one or more processors, when receiving the widget template, are to:
  receive the widget template of a virtual agent widget,
    wherein the one or more fields relate to an automated response of a virtual agent.

10. The device of claim 8, wherein the one or more processors, when receiving the stylesheet, are to:
  receive the stylesheet with the respective style identifiers of the one or more fields,
    wherein the respective style identifiers include information relating to one or more of colors, fonts, dimensions, visual effects, or positions of the one or more fields.

11. The device of claim 8, wherein the one or more processors, when assigning the respective style identifiers to the respective markup object entries, are to:
  assign the respective style identifiers to the respective markup object entries in a format that enables a rendering device to render the widget based on the markup object.

12. The device of claim 8, wherein the one or more processors, when causing the action to be performed, are to:
  transmit the markup object to a rendering device,
    wherein the rendering device renders the widget according to the markup object.

13. The device of claim 8, wherein the one or more processors, when causing the action to be performed, are to:
  assign a widget identifier to the markup object;
  update a widget library with the markup object; and
  enable the markup object to be indexed by the widget identifier.

14. The device of claim 8, wherein the one or more processors, when causing the action to be performed, are to:
  generate a graphical user interface,
    wherein the graphical user interface renders a preview of the widget based on the markup object,
    wherein the preview is modifiable via the graphical user interface, and
    wherein a modification of the preview causes a corresponding modification to the markup object.

15. A non-transitory computer-readable medium storing instructions, the instructions comprising:
  one or more instructions that, when executed by one or more processors, cause the one or more processors to:
    receive a widget template of a widget,
      wherein the widget template includes information relating to a static field of the widget, a dynamic field of the widget, and static content for the static field;
    receive a data template of the widget,
      wherein the data template includes information relating to dynamic content for the dynamic field;
    receive, from a network storage device, the dynamic content associated with the dynamic field;
    receive a stylesheet of the widget,
      wherein the stylesheet includes information relating to respective style identifiers of the static field and the dynamic field, and
      wherein the stylesheet uses a naming scheme which includes information that defines the respective style identifiers by appending a corresponding style ruleset with information identifying the widget;
    generate a markup object of the widget based on the widget template and the data template,
      wherein the markup object includes respective markup object entries for populating the static field with the static content and populating the dynamic field with the dynamic content;
    assign the respective style identifiers to the respective markup object entries based on the naming scheme; and
    cause the widget to be rendered according to the markup object.

16. The non-transitory computer-readable medium of claim 15, wherein the one or more instructions, that cause the one or more processors to receive the widget template, cause the one or more processors to:
  receive the widget template of a virtual agent widget,
    wherein the static field and the dynamic field relate to an automated response of a virtual agent.

17. The non-transitory computer-readable medium of claim 15, wherein the one or more instructions, that cause the one or more processors to receive the data template, cause the one or more processors to:
  receive the data template with a data object indexing the dynamic content,
    wherein the data object is to cause the dynamic content to be received from the network storage device.

18. The non-transitory computer-readable medium of claim 15, wherein the one or more instructions, that cause the one or more processors to receive the stylesheet, cause the one or more processors to:
  receive the stylesheet with the respective style identifiers of the static field and the dynamic field,
    wherein the respective style identifiers include information relating to one or more of colors, fonts, dimensions, visual effects, or positions of the static field or the dynamic field.

19. The non-transitory computer-readable medium of claim 15, wherein the one or more instructions, that cause the one or more processors to generate the markup object, cause the one or more processors to:
   populate the static field with the static content; and
   populate the dynamic field with the dynamic content,
      wherein the dynamic content is populated in real-time based on a data object embedded in the data template.

20. The non-transitory computer-readable medium of claim 15, wherein the one or more instructions, that cause the one or more processors to assign the respective style identifiers to the respective markup object entries, cause the one or more processors to:
   assign the respective style identifiers to the respective markup object entries in a format that enables a rendering device to render the widget based on the markup object.

* * * * *